(12) United States Patent
Carawan et al.

(10) Patent No.: US 8,636,048 B2
(45) Date of Patent: Jan. 28, 2014

(54) TIRE RUN-FLAT REMOVAL AND INSTALLATION MACHINE

(76) Inventors: James R. Carawan, Elizabeth City, NC (US); Monica L. Carawan, Elizabeth City, NC (US); Al Turner, Elizabeth City, NC (US); Jennifer Turner, Elizabeth City, NC (US); Dale Hall, Elizabeth City, NC (US)

( * ) Notice: Subject to any disclaimer, the term of this patent is extended or adjusted under 35 U.S.C. 154(b) by 49 days.

(21) Appl. No.: 12/994,844

(22) PCT Filed: May 29, 2009
(Under 37 CFR 1.47)

(86) PCT No.: PCT/US2009/003282
§ 371 (c)(1),
(2), (4) Date: Jul. 2, 2012

(87) PCT Pub. No.: WO2009/148544
PCT Pub. Date: Dec. 10, 2009

(65) Prior Publication Data
US 2012/0279667 A1    Nov. 8, 2012

Related U.S. Application Data

(60) Provisional application No. 61/071,994, filed on May 29, 2008.

(51) Int. Cl.
*B60C 25/00* (2006.01)
*B60C 25/05* (2006.01)
(52) U.S. Cl.
CPC ..................................... *B60C 25/00* (2013.01)
USPC ................................................ 157/14; 157/1

(58) Field of Classification Search
USPC ........................... 157/1, 14; 29/235; 152/520
See application file for complete search history.

(56) References Cited

U.S. PATENT DOCUMENTS

| 3,976,114 A | 8/1976 | Patecell |
| 4,580,612 A | 4/1986 | Smithkey |
| 7,546,865 B2 * | 6/2009 | Giovannucci et al. ....... 157/1.24 |
| 2005/0028367 A1 | 2/2005 | Lowen et al. |
| 2005/0217781 A1 | 10/2005 | Gardetto |
| 2005/0269006 A1 | 12/2005 | Christenbury et al. |
| 2006/0086447 A1 | 4/2006 | Kimura |
| 2006/0144110 A1 | 7/2006 | Sano et al. |
| 2007/0084535 A1 | 4/2007 | Resare et al. |
| 2007/0144681 A1 | 6/2007 | Cunningham |
| 2007/0199636 A1 | 8/2007 | Tanno |
| 2007/0251649 A1 | 11/2007 | Giovannucci et al. |
| 2008/0010804 A1 | 1/2008 | Giovannucci et al. |

FOREIGN PATENT DOCUMENTS

| JP | 2000/238518 | 9/2000 |
| JP | 2006/321476 | 11/2006 |
| WO | WO 2005/095128 | 10/2005 |
| WO | WO 2007/029725 | 3/2007 |

* cited by examiner

*Primary Examiner* — David B Thomas
(74) *Attorney, Agent, or Firm* — Richard C. Litman

(57) ABSTRACT

The tire run-flat ring removal and installation machine includes three basic embodiments, each having a tire support table (14) and actuators for removing and/or reinstalling the run-flat ring (R) in the tire (T). The actuators may be hydraulically, pneumatically, or electromechanically powered, and save the technician considerable time and effort in the process.

20 Claims, 22 Drawing Sheets

TIRE RUN-FLAT REMOVAL AND INSTALLATION MACHINE

CROSS-REFERENCE TO RELATED APPLICATION

This application is a 371 of PCT/US2009/03282, filed May 29, 2009, which claims the benefit of U.S. Provisional Patent Application Ser. No. 61/071,994, filed May 29, 2008.

TECHNICAL FIELD

The present invention relates generally to equipment for removing, repairing, and installing tires. More specifically, the present invention is a tire run-flat ring removal and installation machine that provides a powered machine for removing and replacing the solid run-flat ring in a pneumatic tire once the tire and ring assembly has been removed from the wheel.

BACKGROUND ART

A number of different configurations of tires having some form of run-flat capability are known, i.e., the tire does not go completely flat when punctured or damaged, but retains at least a large percentage of its original sidewall height due to sidewall construction, an insert within the tire, etc. One principle of run-flat tire uses an essentially conventional tire with a solid rubber run-flat ring installed within the tire at the time the tire is installed upon its wheel. The run-flat ring has an outer diameter slightly less than the inner diameter of the tire casing, but has a section height of at least a few inches in order to prevent the complete collapse of the tire if the casing is penetrated. Such run-flat rings are commonly installed in tires used on many military vehicles, particularly those used in combat zones or areas of hazardous duty. Such run-flat rings permit the vehicle to maintain its speed after the tire is penetrated by gunfire, shrapnel, etc., thus allowing the vehicle to escape a potential ambush.

When a tire is damaged and requires replacement, oftentimes the run-flat ring is reusable. Accordingly, the tire repair technician will remove the run-flat ring from the old tire and reinstall the ring in a new or serviceable tire. Such tire and run-flat ring assemblies are installed on so-called "split wheels," i.e., the wheel has inner and outer portions that bolt together, sandwiching the center of the tire therebetween. After removing the wheel and tire assembly from the vehicle, the technician initially verifies that there is no residual air pressure within the tire and then separates the two wheel halves of the split wheel and removes them from the tire.

At this point, the run-flat ring can be removed from the tire casing. Conventionally, this has been done by means of a strap installed diametrically about the run-flat ring while it is still installed within the tire casing. The technician then uses a ratcheting binder mechanism to draw up the strap, thereby compressing the run-flat ring across its diameter. One end of the long axis of the compressed run-flat ring can be worked further into the tire casing, with the opposite end being withdrawn from the casing for removal of the ring. The above-described procedure is quite tedious and taxing and requires a significant amount of time, perhaps as much as an hour or more for the removal of a single run-flat ring. The process must then be reversed to reinstall the run-flat ring in another tire.

Thus a tire run-flat ring removal and installation machine solving the aforementioned problems is desired.

DISCLOSURE OF INVENTION

The tire run-flat ring removal and installation machine comprises several embodiments of a device having a series of powered actuators that grip a tire and run-flat ring placed thereon and manipulate the tire and ring for the removal of the ring from the tire. At least some embodiments of the machine are also capable of reinstalling the ring within a tire casing.

A first embodiment comprises a table having a series of actuators thereunder. Two diametrically opposed actuators operate radially relative to one another, with drive mechanisms extending through the table to compress the run-flat ring diametrically. A third actuator extends upwardly from a base beneath the table and through a slot in the table, and acts to lift one end of the compressed run-flat ring from the tire casing. An additional pair of mutually opposed actuators applies pressure toward one another when actuated, to push the run-flat ring into the tire casing during the reassembly operation. Finally, another series of circumferentially disposed actuators operate a corresponding number of hold-down clamps to secure the tire casing in place while the run-flat ring is being pulled therefrom. Alternatively, a toroidal plate may be placed atop the tire and clamped around the tire to the underlying table, to secure the tire to the table. The various actuators may be hydraulically, pneumatically, or electromechanically powered.

A second embodiment is similar to but somewhat simpler than the first embodiment, and includes two actuators extending upwardly from the underlying base and through slots in the table. The two diametrically opposed and radially traveling actuators serve to compress the run-flat ring across its diameter, while the two upwardly acting actuators lift the two sides of the ring generally normal to its compressed axis to push the lifted ends closer to one another and lift them from the tire casing.

A third embodiment avoids the upwardly extending actuators through the table, but provides four mutually orthogonal and radially acting actuators. These four actuators use rigid clamps secured about the exterior of the run-flat ring within the tire, to compress the ring and permit it to fit through the wheel opening in the center of the tire for withdrawal of the ring from the tire. As in the case of the first embodiment, the various actuators of both the second and third embodiments may be hydraulically, pneumatically, or electromechanically operated.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

Figure 1:
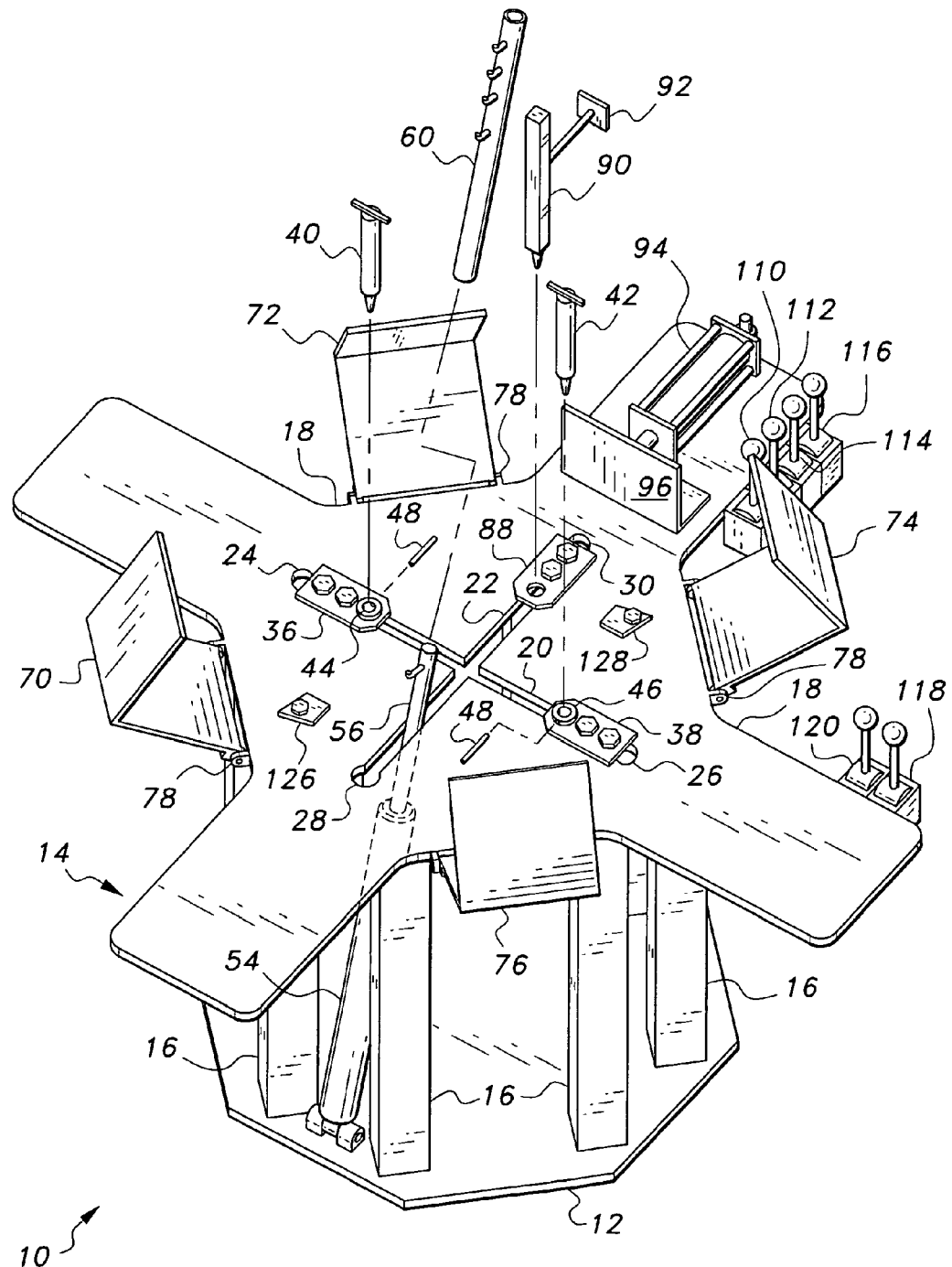
FIG. 1 is a perspective view of a first embodiment of a tire run-flat ring removal and installation machine according to the present invention, with various working tools shown exploded therefrom.

The present invention comprises several embodiments of a tire run-flat ring removal and installation machine. FIGS. 1 through 16 provide various views of a first configuration of the machine 10, with FIG. 1 providing a general perspective view of the machine 10. The machine 10 includes a base 12 supporting a table 14 by a series of legs 16. The periphery 18 of the table includes a series of tire hold-down clamps, discussed in detail further below, while the general central portion of the table 14 includes mutually orthogonal first and second slots, respectively 20 and 22, forming a cruciform configuration, with the first slot having mutually opposed first and second ends 24, 26 and the second slot having mutually opposed first and second ends 28, 30.

Figure 2:
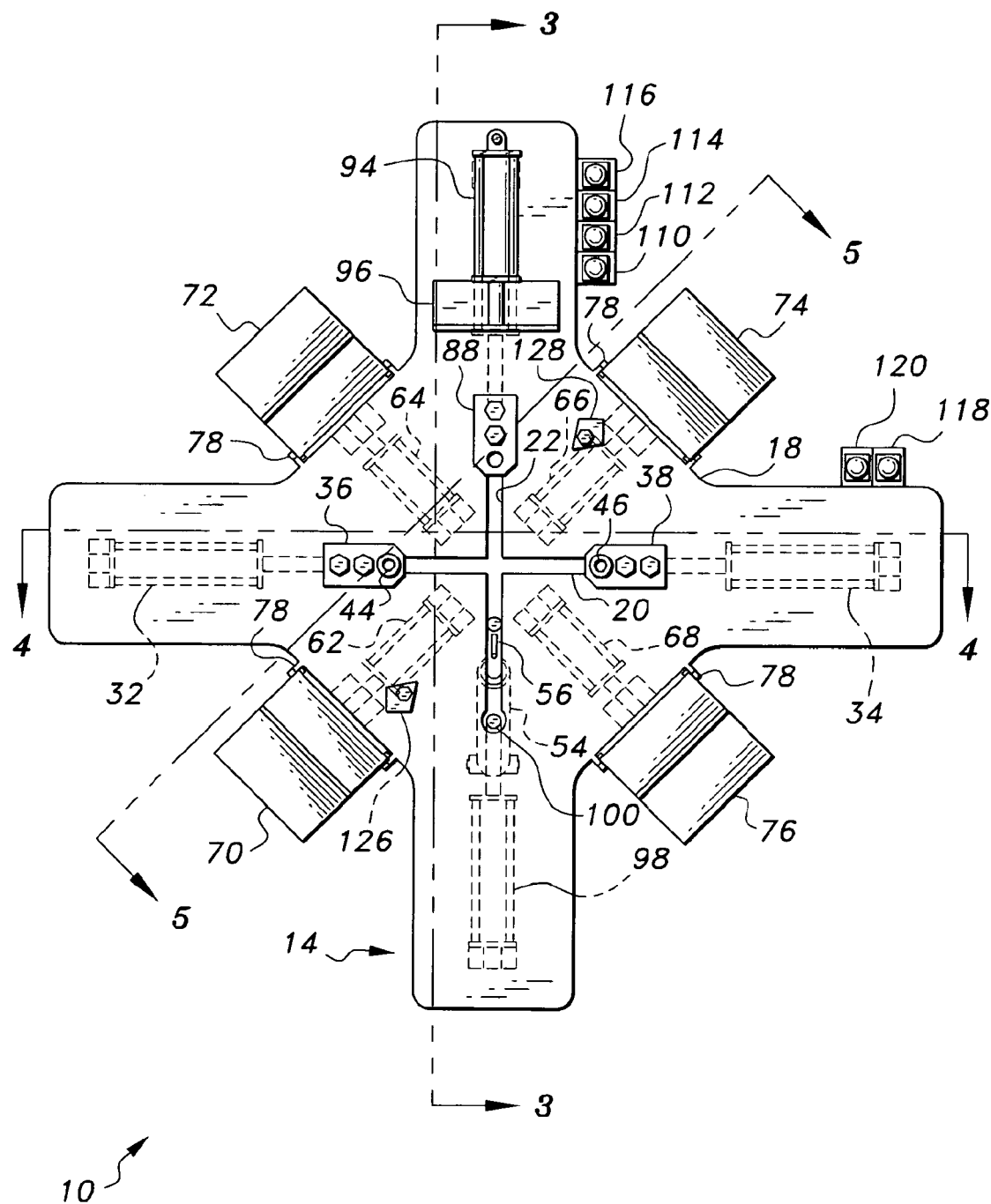
FIG. 2 is a top plan view of the machine of FIG. 1, showing further details thereof.
Figure 4:
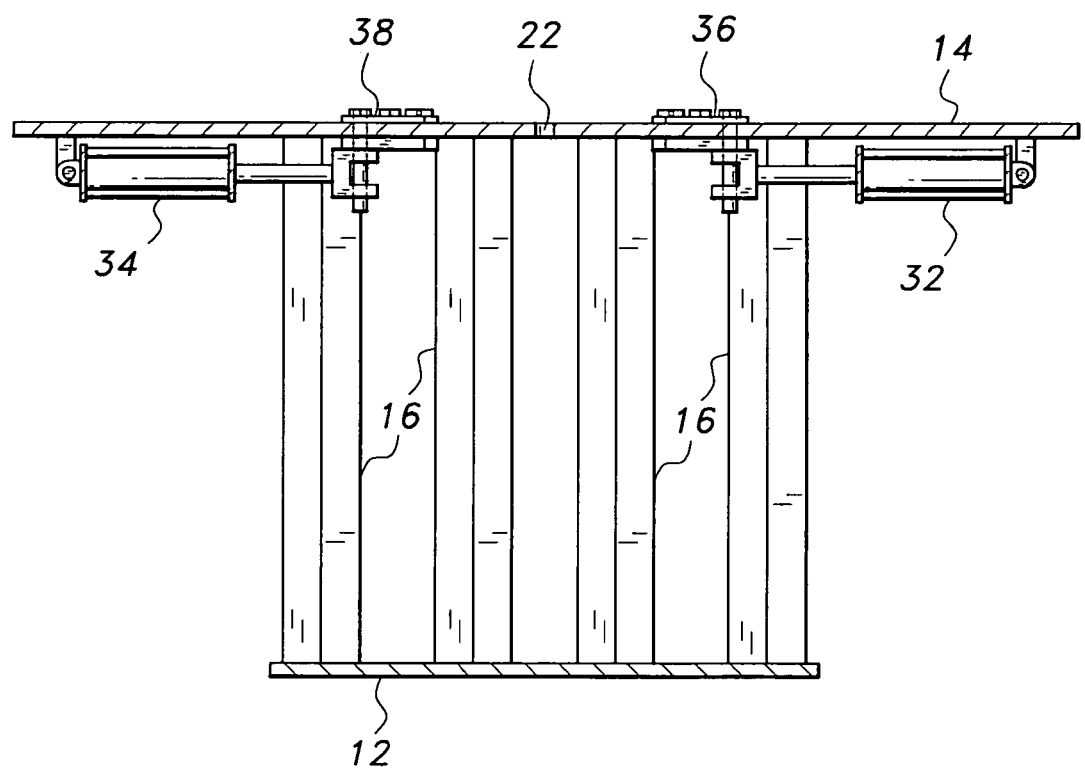
FIG. 4 is a simplified section view along lines 4-4 of FIG. 2, showing a second group of actuators.
Figure 5:
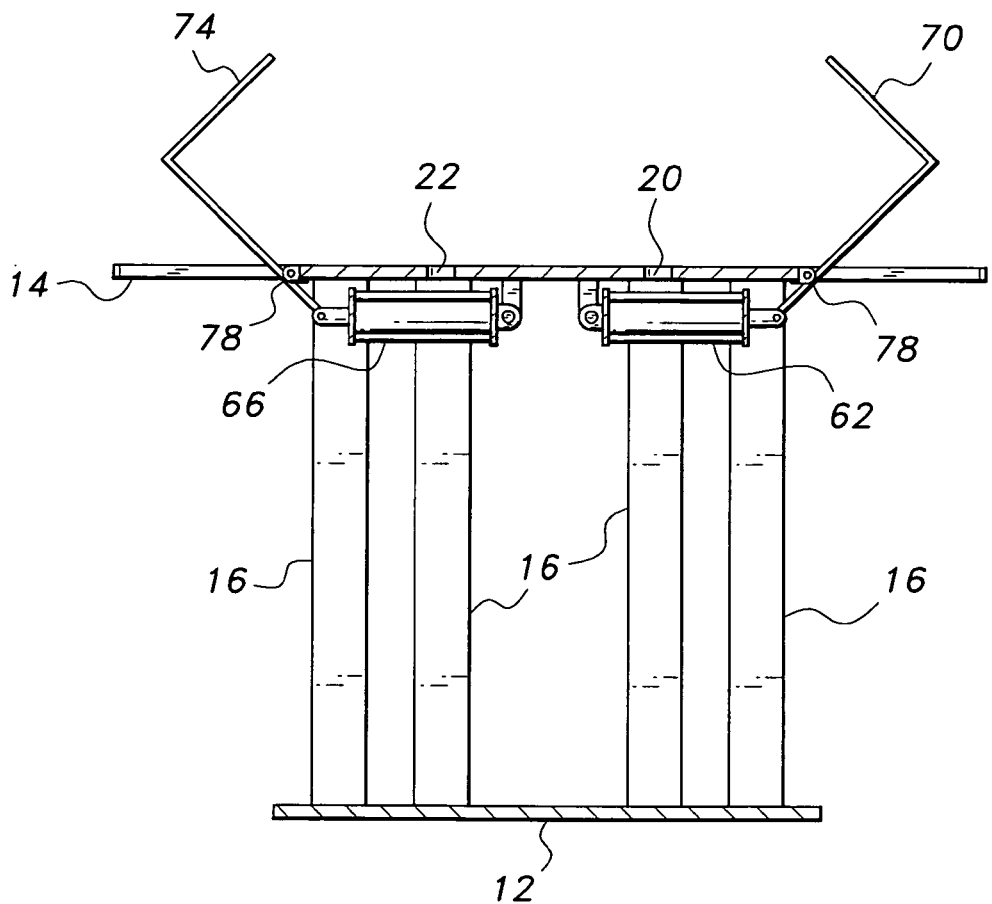
FIG. 5 is a simplified section view along lines 5-5 of FIG. 2, showing a third group of actuators.

FIG. 4 is an elevation view in section along lines 4-4 of FIG. 2, illustrating the run-flat ring compression actuators disposed beneath the table 14. This section is laterally displaced from the centerline of the table along the first slot 20, so that only the end-on view of the second slot 22 is visible in FIG. 4. First and second ring compression actuators, respectively 32 and 34, are attached outwardly from the respective first and second ends 24 and 26 of the first slot 20 and beneath the table 14. These actuators 32, 34, as well as others discussed further below, are preferably operated hydraulically, but may alternatively be actuated pneumatically by compressed air or other gas. Another alternative actuation means comprises a series of conventional electromechanical actuators, e.g., electric motors driving screw jacks, to extend and retract the actuator rods of the various actuators. It will be seen that such different principles of operation may be combined in a single machine 10, if so desired, although preferably a single principle of operation is used in a given machine.

Figure 10:
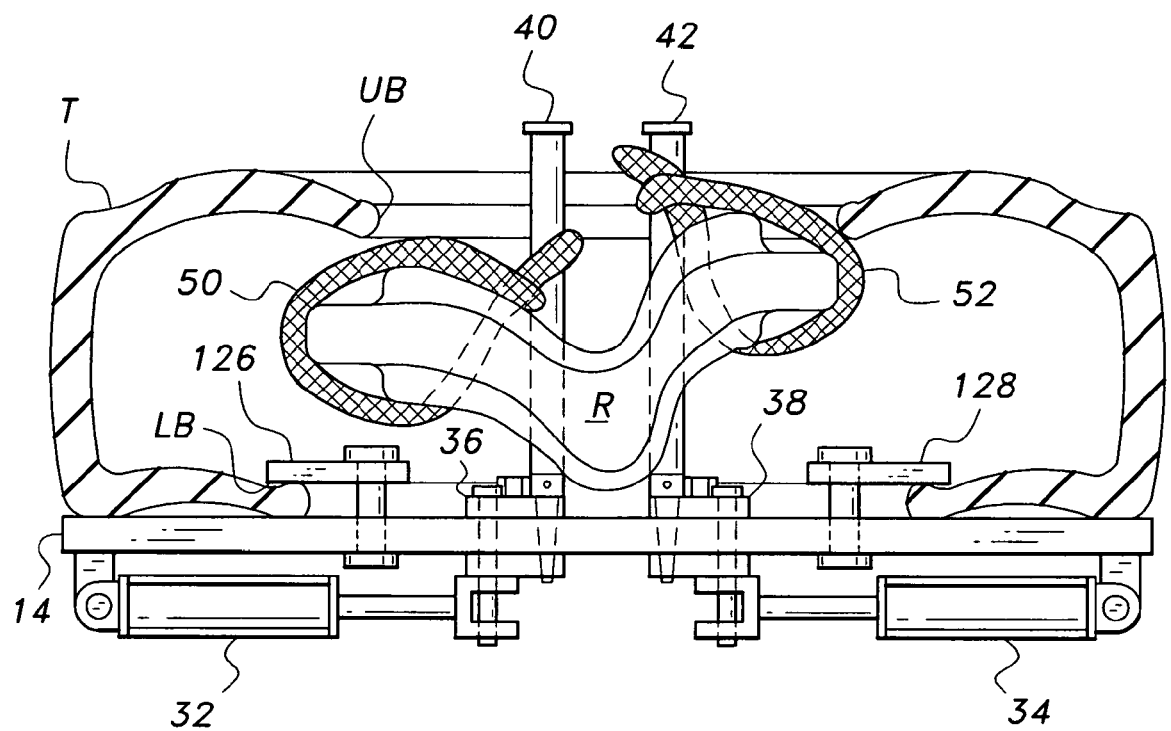
FIG. 10 is a simplified elevation view of the embodiment of FIG. 1 with the tire and run-flat ring placed thereon, the tire being shown in section and the run-flat ring being compressed by the corresponding actuators and tools.

Each ring compression actuator 32, 34 drives an actuator rod or shaft that connects respectively to a first and a second ring compression slide 36, 38. Each of the slides 36, 38 comprises an assembly having a bottom plate to which the distal end of the actuator rod is connected, and an opposite top plate. The two plates slide on opposite sides of the table 14 and are secured to one another by a series of bolts or pins that pass through the first slot 20. First and second ring compression posts, respectively 40 and 42, are removably installed within corresponding sockets or receptacles 44, 46 through the two slide assemblies 36 and 38; see FIGS. 1, 13, and 14. Each compression post preferably has a tapered lower end, with the corresponding compression post socket 44, 46 having a corresponding taper. Diametric pins 48 may be used to lock the posts 40, 42 in their respective sockets 44, 46. First and second ring compression straps, respectively 50 and 52, are removably installed about the respective posts 40, 42 and secured about the run-flat ring to compress the ring; this process is illustrated in FIGS. 10 and 14 and discussed in detail further below.

Additional actuators are disposed beneath the table 14 and operate through the second slot 22. The larger or longer actuator 54 is used to lift or pull the run-flat ring from within the tire casing, after the ring has been compressed by the ring compression slides 36, 38 and their posts 40, 42 and straps 50, 52 disposed within the center of the tire casing. This ring lifting actuator 54 has a base or anchor end pivotally secured to the base 12 of the machine and extends upwardly therefrom, with a distal actuator rod end 56 extending through the second slot 22 adjacent the first end 28 thereof. A run-flat ring lifting strap 58 (FIG. 11) is hooked removably to the distal end of the rod 56 to lift and pull the run-flat ring from the tire casing, which process is described in detail further below. Preferably, the actuator 54 and its extendible rod 56 have sufficient length to preclude need for an extension fixture or tool. However, in the event that a shorter actuator having less travel is used, an extension fixture or tool 60 may be provided for removable placement over the rod end 56, as shown in FIGS. 1 and 11 of the drawings.

A tire hold-down mechanism is provided to secure the tire to the table 14 when the ring is being pulled or lifted from the tire. A first embodiment of this mechanism comprises a series of tire hold-down actuators disposed beneath and peripherally about the table 14, shown most clearly in FIGS. 5 and 11 through 13. Preferably, four such tire hold-down actuators 62 through 68 are provided, although more or fewer may be provided as desired. The actuators are preferably hydraulically powered, although other actuator principles may be used as described further above for the two ring compression actuators 32 and 34. Each tire hold-down actuator has an actuator rod attached to a depending extension of a corresponding tire hold-down clamp, respectively 70 through 76. Each of the generally L-shaped clamps is attached to the periphery of the table 14 by a hinge or pivot mechanism 78, and pivots about the hinge 78 depending upon actuation by its respective actuator.

When the tire hold-down actuators 62 through 68 are actuated, their rod ends extend outwardly to push the depending extensions of the corresponding hold-down clamps 70 through 76 outwardly, which causes the upper portions of the clamps to pivot inwardly about their hinges 78 to grip the tire therebetween and against the upper surface of the table 14. Reversal of the hold-down actuators 62 through 68 reverses the motion of the clamps 70 through 76, opening the clamps to allow the tire to be removed from the table 14 or for another tire to be placed upon the table. The sequence of events in removing and reinstalling a run-flat ring in a tire using the present machine 10, including the operation of the tire hold-down actuators and clamps, is shown in FIGS. 8 through 16 and discussed in detail further below.

Figure 11:
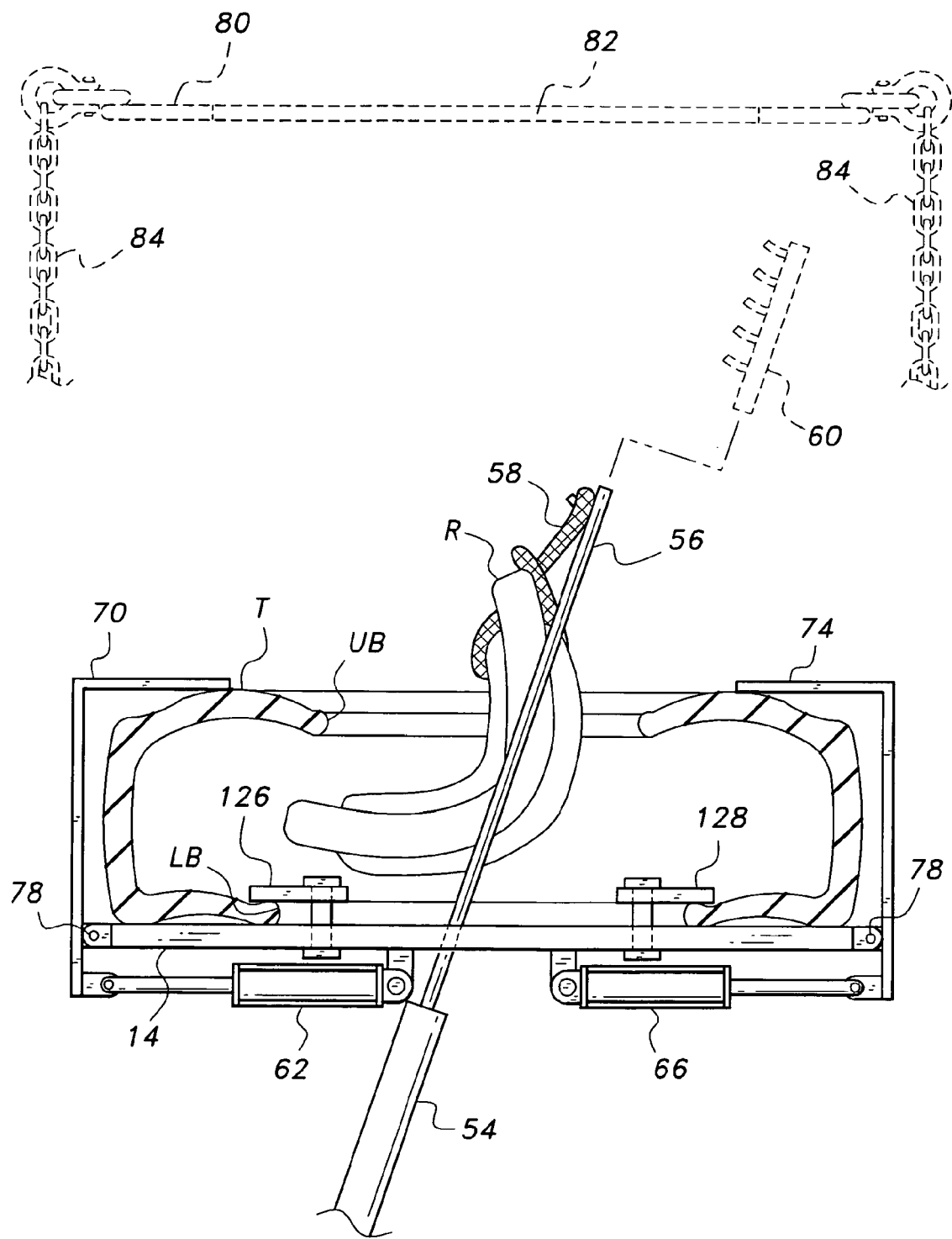
FIG. 11 is a simplified elevation view of the embodiment of FIG. 1 with the tire and run-flat ring thereon, the tire being shown in section and the run-flat ring being pulled therefrom by the corresponding actuator.

An alternative tire hold down mechanism is shown in FIG. 11 in broken lines, as an option. The alternative hold-down comprises a relatively rigid plate 80 (steel, etc.) having a generally toroidal shape with a tire opening access hole 82 through its center. A series of removable clevises or other attachments is provided about the periphery of the hold-down plate 80, with a corresponding tensile fastener 84 (e.g., chain, cable, etc.) extending from each clevis. The distal ends of the chains or other fasteners 82 are secured to the periphery 18 of the table 14 to hold the tire down by means of conventional hooks or the like (not shown), and are removed for removal of the tire.

Figure 3:
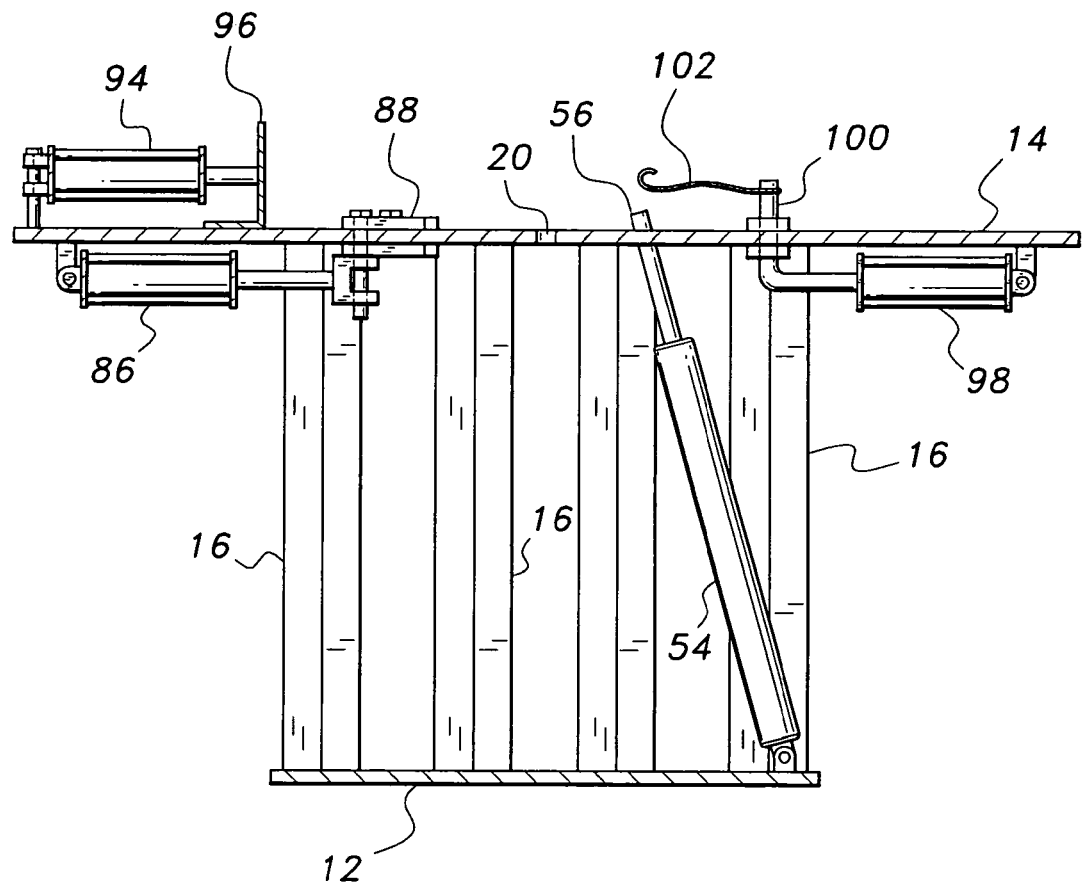
FIG. 3 is a simplified section view along lines 3-3 of FIG. 2, showing a first group of actuators.
Figure 15:
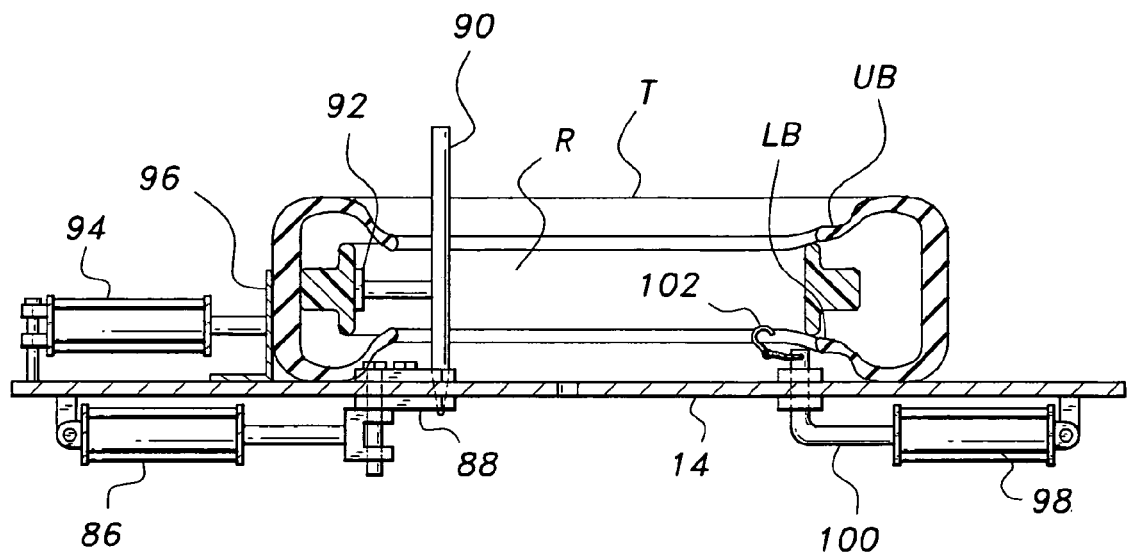
FIG. 15 is a simplified elevation view of the embodiment of FIG. 1, showing the operation of the two opposed actuators in pushing the run-flat ring into the tire casing.
Figure 16:
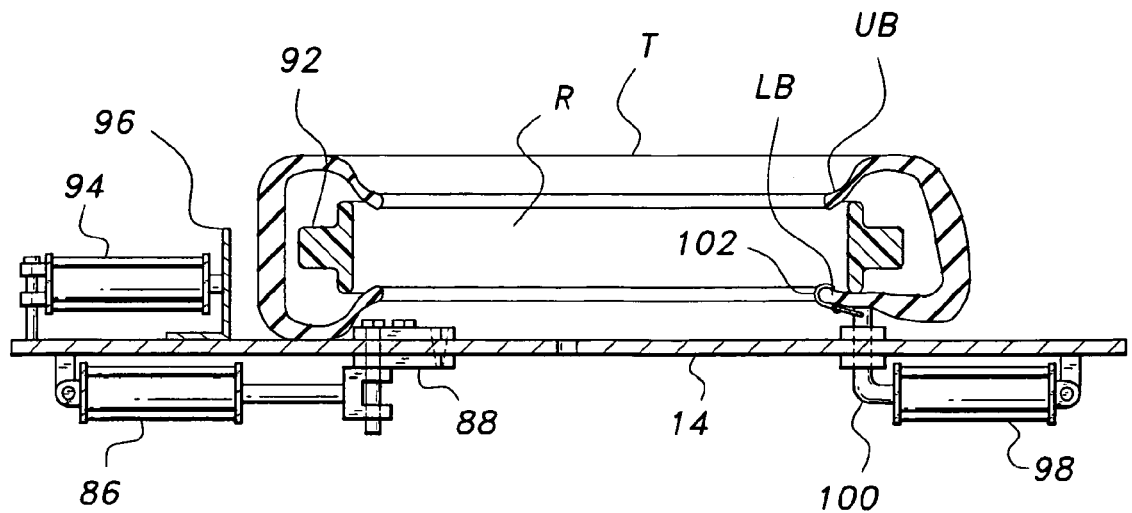
FIG. 16 is a simplified elevation view of the embodiment of FIG. 1 showing an actuator pulling the lower bead of the tire back and down to facilitate insertion of the run-flat ring into the tire.

FIG. 3 is a side elevation view in section along lines 3-3 of FIG. 2, showing the final three actuators used in the machine 10. These three actuators serve to manipulate the tire casing and run-flat ring during installation of the ring into the tire, as shown in FIGS. 15 and 16 and discussed further below. The first of these actuators is the run-flat ring push actuator 86, used to push the run-flat ring into the tire casing during assembly. The ring push actuator 86 is disposed beneath the table 14 and outwardly from the second end 30 of the second slot 22, opposite the ring lifting actuator 54. This ring push actuator 86 retracts its extension rod when actuated, to drive a ring push slide 88 outwardly along the second slot 22. The ring push slide 88 has a configuration substantially the same as the two ring compression slides 32 and 34, discussed further above. A ring push tool 90 is removably installed in the ring push slide, in much the same manner as that used to install the two ring compression posts 40 and 42 in their respective slides 36 and 38. The ring push tool 90 has a shoe or plate 92 extending radially therefrom, which contacts the inside surface of the run-flat ring to push the ring outwardly from the center of the table and into the tire when the ring push actuator is operated.

The outward pressure of the ring push tool 90 must be counteracted by some means to prevent the tool 90 from pushing the run-flat ring and tire across the table 14 during the installation of the ring into the tire. Accordingly, a tire retaining actuator 94 is installed atop the table 14, outboard of the outer end 30 of the second slot 22 overlying the ring push actuator 86 and radially aligned with the ring push actuator slide 88. The tire retaining actuator 94 pushes a tire push plate 96 inwardly, i.e., toward the outwardly pushing shoe 92 of the ring push tool 90, to hold the tire in place or push the tire toward the ring as the ring is being pushed into the tire. This operation is shown in FIG. 15 and discussed in detail further below.

Finally, a tire lower bead puller actuator 98 is installed beneath the table 14, outwardly from the ring lifting actuator 54 and aligned radially with the actuator 54 and second slot 22. The actuator arm 100 of the lower bead puller actuator 98 is generally L-shaped, with its distal end passing through the second slot 22 and terminating above the table 14. A flexible cable and hook assembly 102 is attached to the upper end of the actuator arm 100 with the hook being used to pull the lower bead of the tire open for finalizing the installation of the run-flat ring therein, generally as shown in FIG. 16 and explained in detail further below.

Figure 6:
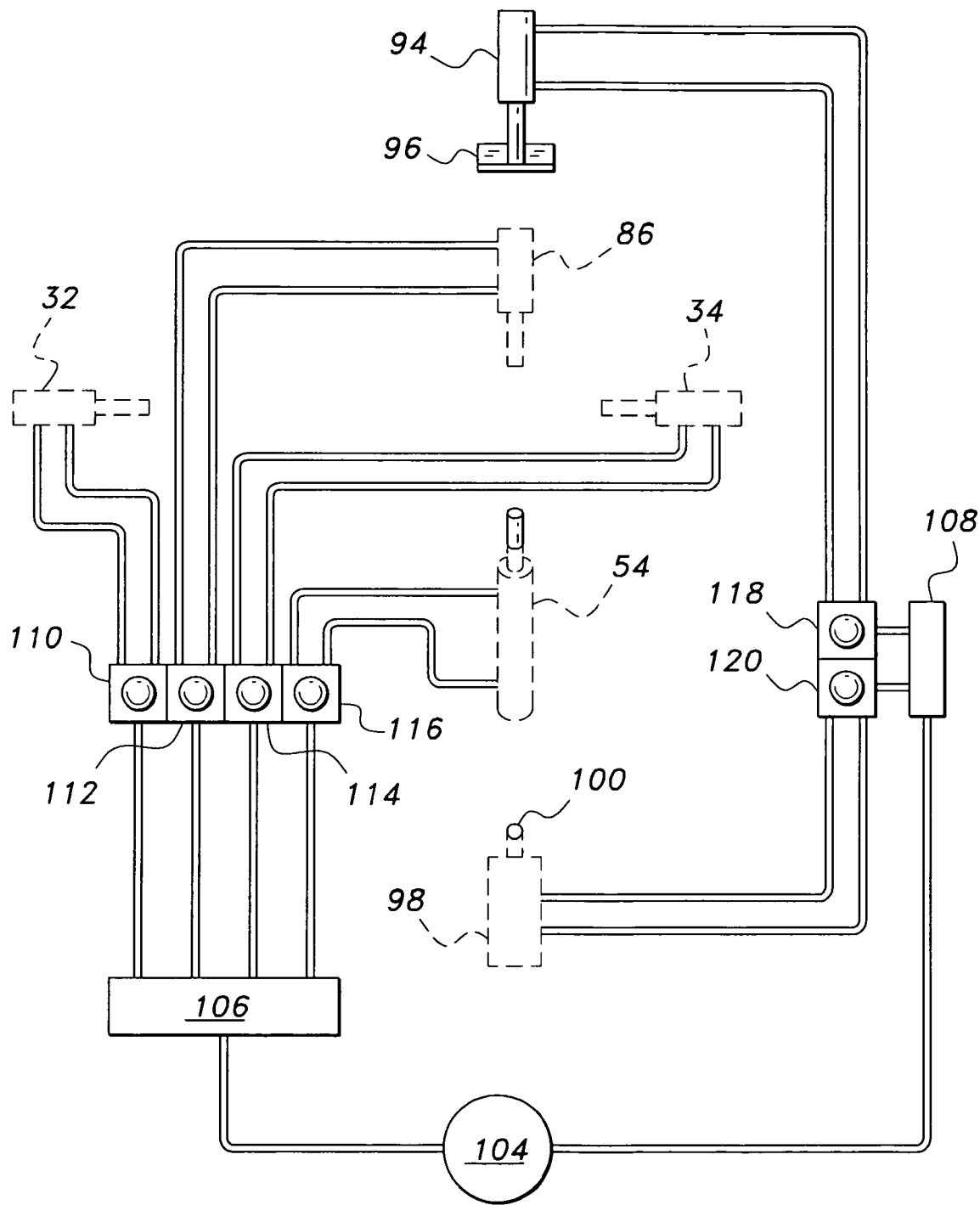
FIG. 6 is a diagrammatic view of an exemplary hydraulic or pneumatic system for actuating the first and second groups of actuators in the embodiment of FIG. 1.
Figure 7:
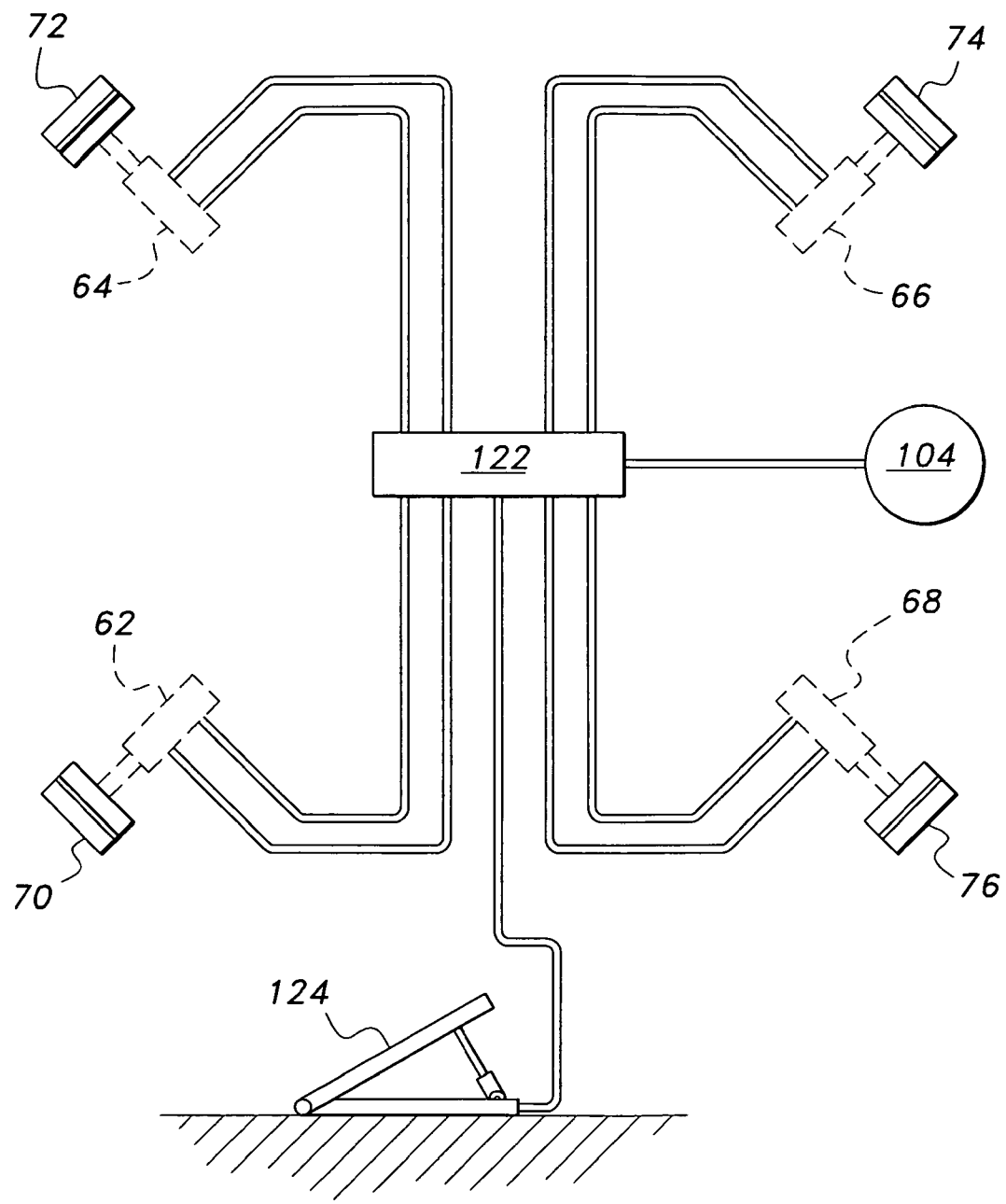
FIG. 7 is a diagrammatic view of an exemplary hydraulic or pneumatic system for actuating the third group of actuators of the embodiment of FIG. 1.

FIGS. 6 and 7 provide schematic views of exemplary hydraulic systems for use with the present machine 10 to drive its various actuators. FIG. 6 is a schematic illustration of the system for powering the first and second ring compressor actuators 32 and 34, the ring lifting actuator 54, the ring push actuator 86 and tire retaining actuator 94, and the tire lower bead puller actuator 98. A common source of hydraulic pressure is provided, e.g., a hydraulic pump and reservoir 104, to supply hydraulic fluid under pressure to the various actuators. The pump 104 supplies fluid to first and second manifolds, respectively 106 and 108, which in turn supply hydraulic fluid to a series of two-way valves. It will be seen that the manifolds may comprise a series of ganged fittings or the like, or may be eliminated if the pump 104 has a sufficient number of outlets for plumbing directly to the valves.

The first manifold 106 supplies fluid to four hydraulic valves, respectively 110 through 116, preferably mounted upon the table 14 generally as shown in FIGS. 1 and 2. The first of these valves 110 controls fluid to and from the first ring compressor actuator 32, while the third valve 114 controls fluid to and from the second ring compressor actuator 34. It will be seen that in practice these two control valves 110 and 114 may be placed adjacent to one another if desired by rerouting the various hydraulic lines, but the schematic shown in FIG. 6 provides a clear showing of the exemplary hydraulic system by avoiding the crossing of any of the various lines. The second valve 112 controls the ring push actuator 86, while the fourth valve 116 controls the ring lifting actuator 54.

The second manifold 108 supplies pressurized fluid to the fifth and sixth valves, respectively 118 and 120. The fifth valve 118 controls the tire retaining actuator 94, while the sixth valve 120 controls the tire lower bead puller actuator 98. As in the case of the first and third control valves 110 and 114 controlling the two opposite ring compressor actuators, the various valves may be repositioned to control more closely related actuators and functions, if so desired. Each of the actuators is double acting, i.e., provides positive force both to extend and to retract its ram. Accordingly, each of the valves 110 through 120 is a double-acting valve. Alternatively, some of the valves might be eliminated, e.g., the third valve 114, and a single valve 112 used to control both of the opposed run-flat ring compressor actuators simultaneously. However, the system represented by the schematic of FIG. 6 provides the operator with complete and independent control of each actuator, for fine adjustments as desired. Conventional hydraulic fluid return lines between the valves, manifolds, and pump and reservoir are not shown in order to clarify the drawing Fig.

FIG. 7 is a schematic drawing of an exemplary hydraulic system for the four tire hold-down actuators 62 through 68. The hold-down actuator hydraulic system may draw hydraulic power from the same pump and reservoir system 104 as used to provide power for the hydraulic system of FIG. 6. The pump provides hydraulic fluid under pressure to a manifold 122, with the manifold in turn supplying hydraulic pressure to the four double-acting actuators 64 through 68. Preferably, these four actuators are operated in unison with one another by a single control, e.g., a foot pedal 124. As in the case of the hydraulic system of FIG. 6, conventional details such as return lines from the manifold to the pump and reservoir are not shown for clarity in the drawing Fig.

As noted further above, the preferred operating system for the present tire run-flat ring installation and removal machine 10 is hydraulic. However, such a system may also be used as a pneumatic system to provide pressurized air or other gas to pneumatic actuators for operation, if so desired. It will also be seen that the hydraulic lines illustrated in FIGS. 6 and 7 may also represent electrical lines supplying electrical power to electromechanical actuators (e.g., screw drives powered by electric motors), if so desired.

Figure 8:
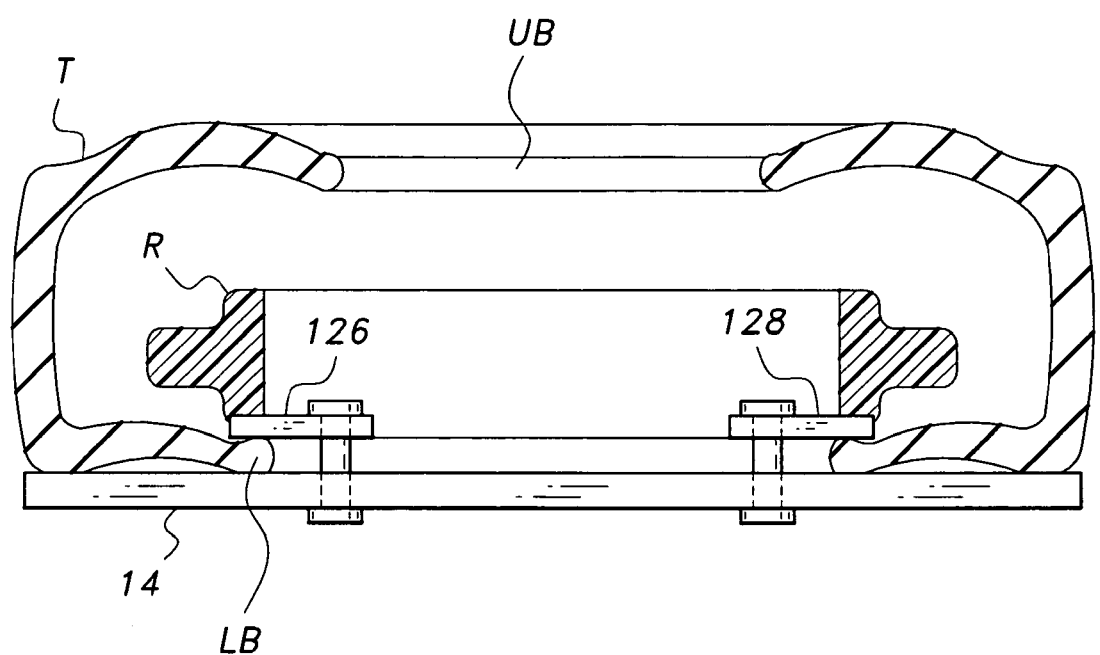
FIG. 8 is a simplified side elevation view of the embodiment of FIG. 1 with a tire and run-flat ring placed thereon, the tire and ring being shown in section to show the clamps holding the lower bead of the tire to the table.

FIGS. 8 through 16 illustrate the operation of the machine 10, from the initial placement of a tire and run-flat ring assembly thereon to the final assembly of a new tire and/or run-flat ring thereon. In FIG. 8, the initial step of securing the tire T (shown in section in FIGS. 8 through 11, 15, and 16) to the table 14 is shown, with the run-flat ring R (shown in section in FIGS. 8, 9, 15, and 16) contained within the tire T. The tire is secured to the table 14 by a pair of lower bead hold-down chocks 126, 128 attached to the table by corresponding pins. The pins are sufficiently long to allow the chocks to slide upwardly for spacing away from the table surface, thereby allowing the lower bead LB of the tire T to be captured between the chocks 126 and 128 and the underlying table surface. The chocks are preferably asymmetrically mounted upon their pins to allow them to be swiveled or pivoted around so their longer ends extend over the lower bead LB of the tire T to secure the tire to the table 14. This also expands the space or distance between the lower bead LB and the opposite upper bead UB, to facilitate access to the interior of the tire T and the run-flat ring R contained therein.

Figure 9:
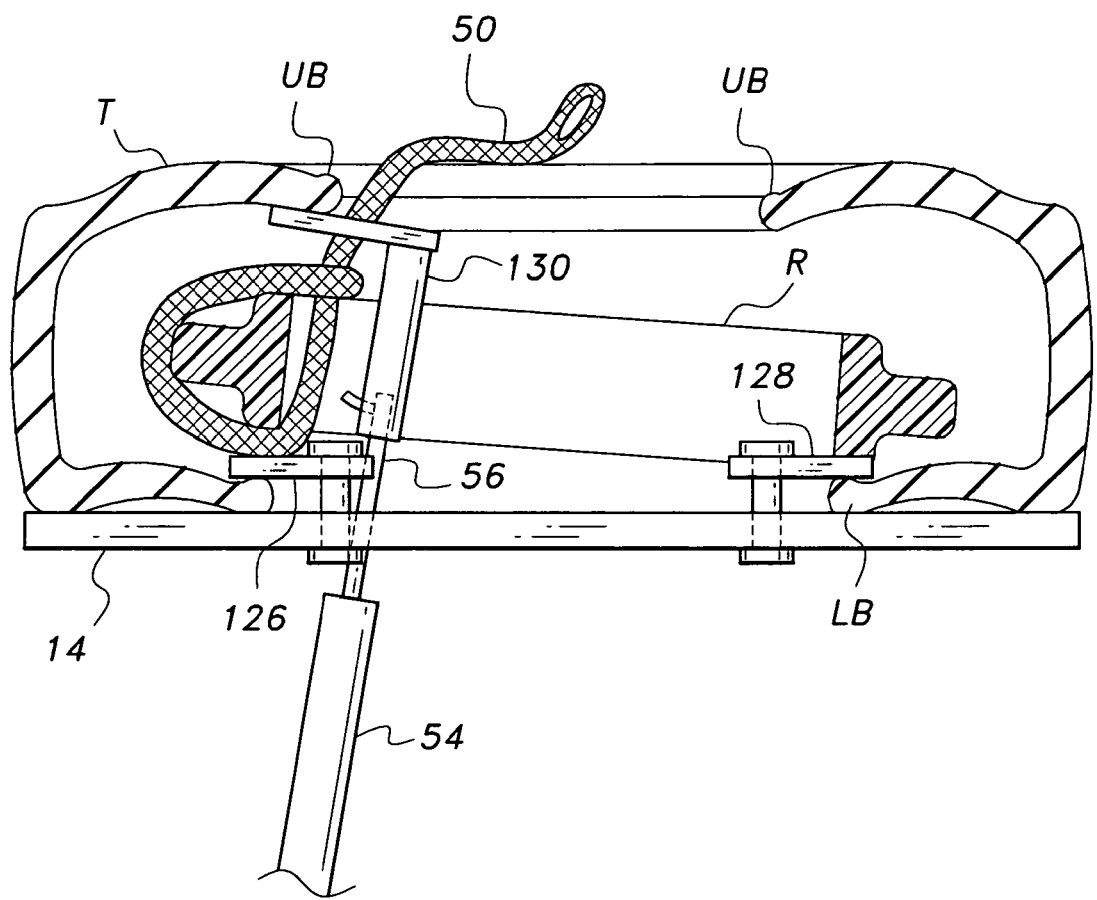
FIG. 9 is a simplified elevation view of the embodiment of FIG. 1 with the tire and run-flat ring shown in section thereon, showing the lifting of the upper bead of the tire to access the run-flat ring therein.

In FIG. 9, the upper bead UB of the tire T is being pulled farther away from the lower bead LB to the left side of the illustration, to further facilitate access to the interior of the tire. The lifting of the upper bead UB is accomplished by a tire upper bead lifting tool 130 removably installed upon the upper or distal end of the rod end 56 of the ring lifting actuator 54. The actuator 54 is primarily used to lift the ring R from the tire T, but this actuator has additional functions as well. The upper bead lifting tool 130 comprises a short pipe or tube having a slot in one side to fit over the lifting hook extending from the upper end of the rod end 56. The pipe or tube has a lifting finger or plate extending laterally therefrom, with the plate being placed beneath the upper bead UB of the tire T. When the actuator 54 is operated to extend the rod end 56, the upper bead lifting tool 130 raises the upper bead UB to provide greater access to the interior of the tire T with its run-flat ring R contained therein. At this point, the operator wraps the ring lifting strap 58 around the run-flat ring R, either passing one end of the strap back through an eye at the end of the strap as shown, or extending both ends from the interior of the tire T to wrap about the corresponding run-flat ring compression post 40 or 42.

FIG. 10 shows the results of the upper bead lifting process, and the securing of the first and second ring compression straps 50 and 52 about opposite sides of the run-flat ring R. In this drawing, the ends of the two straps 50 and 52 are secured to the corresponding ring compression posts 40 and 42, and the two posts have been pushed together by actuating their respective ring compression actuators 32 and 34. This causes the run-flat ring R to compress, as shown in FIG. 10, so one side of the ring R may be withdrawn from the tire T through the opening in the center of the tire.

In FIG. 11, the run-flat ring R is shown being lifted from the tire T by the ring lifting actuator 54 and its extension rod end 56. The tire T is more firmly secured to the table 14 by actuating the four tire hold-down actuators 62 through 68 (two of which are shown in FIG. 11) to drive the corresponding tire hold-down clamps 70 through 76 inwardly and over the top of the tire T. A ring lifting strap 58 is passed around the ring R in the manner used to secure the ring compression straps 50 and 52 about the ring, and the free end(s) of the strap 58 is hooked to the hook or finger protruding from the distal end of the rod end 56. The actuator 54 is then extended to pull the ring R from within the tire T. Alternatively, a rod end extension fixture or tool 60 may be placed upon the rod end 56, in the event that the actuator and/or rod end does not provide sufficient extension.

Figure 12:
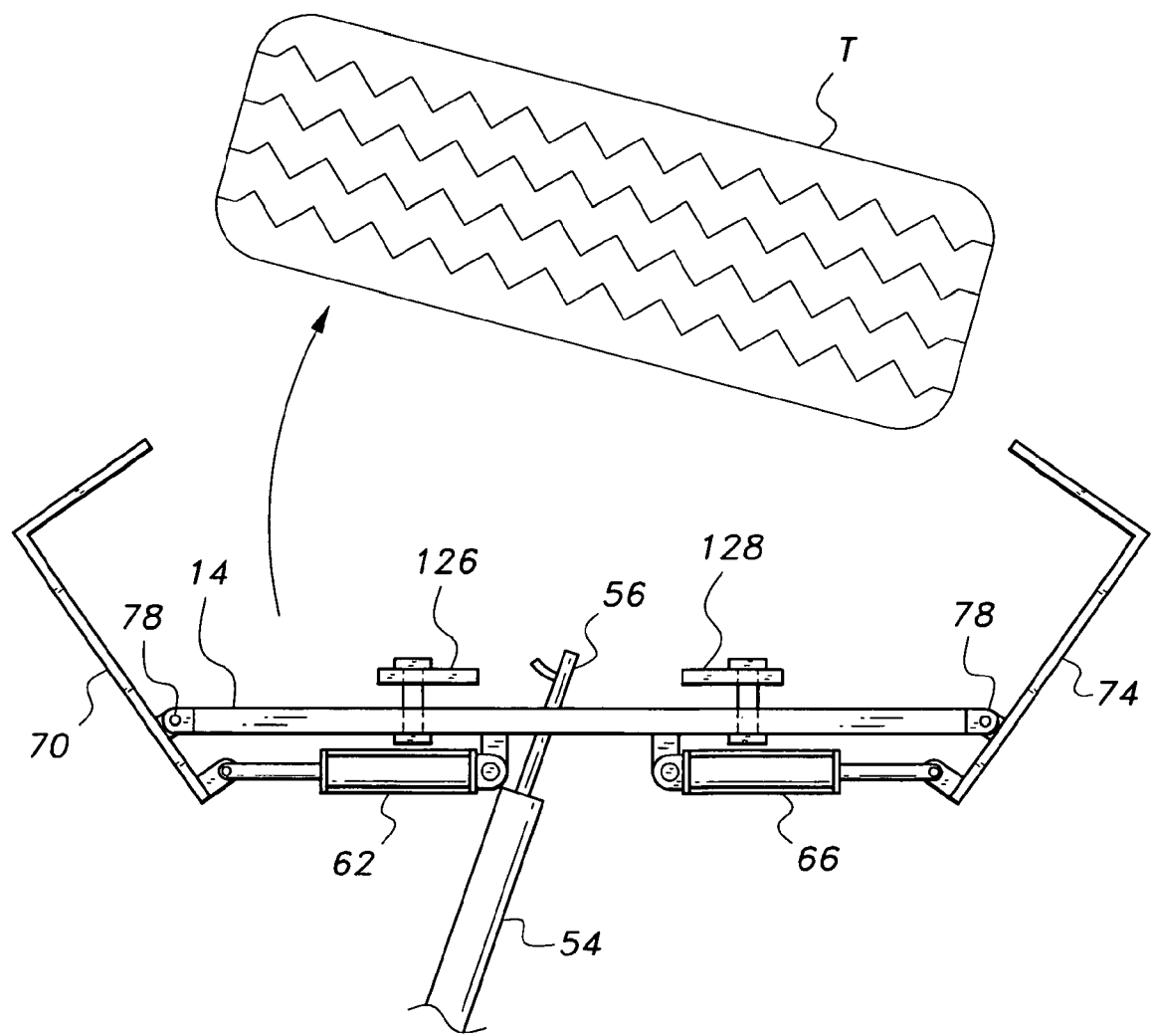
FIG. 12 is a simplified elevation view of the embodiment of FIG. 1, showing the release of the tire hold-down clamps and removal of the tire from the machine.

Once the run-flat ring has been removed from the tire T, the tire may also be removed from the machine 10 as shown in FIG. 12 of the drawings. The four tire hold-down actuators 62 through 68 have been reversed from their position as shown in FIG. 11, to move the clamps 70 through 76 outwardly from the top of the tire T. The two lower bead hold-down chocks 126 and 128 have been turned so their longer portions are oriented toward the center of the table 14, thus releasing the lower bead of the tire T and allowing it to be removed from the machine as shown.

Figure 13:
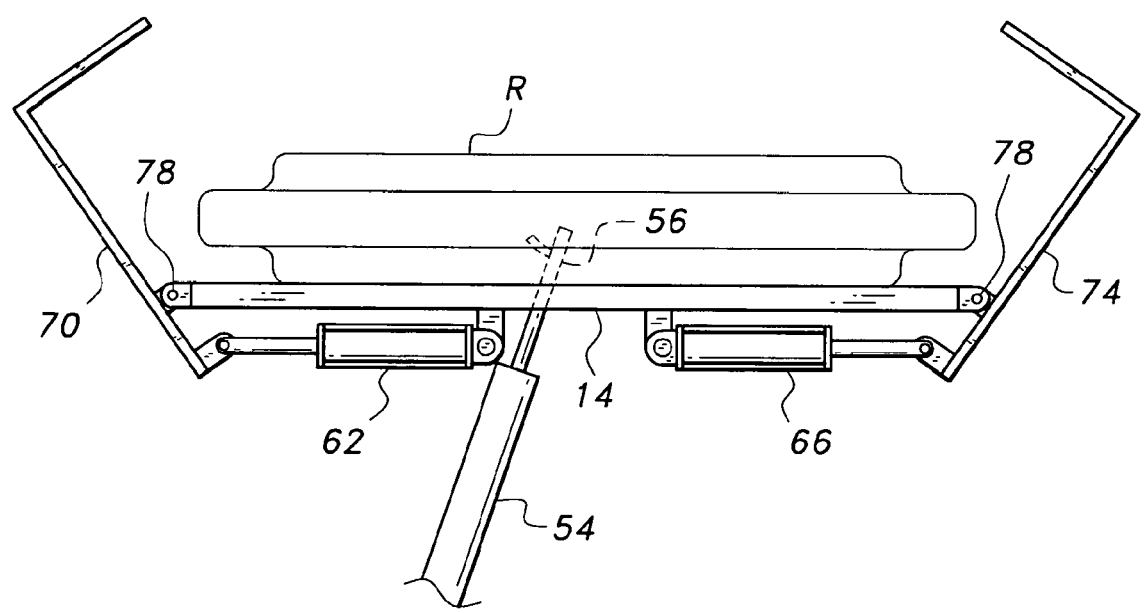
FIG. 13 is a simplified elevation view of the embodiment of FIG. 1, wherein the run-flat ring has been placed upon the table in preparation for reinstallation in a tire casing.
Figure 14:
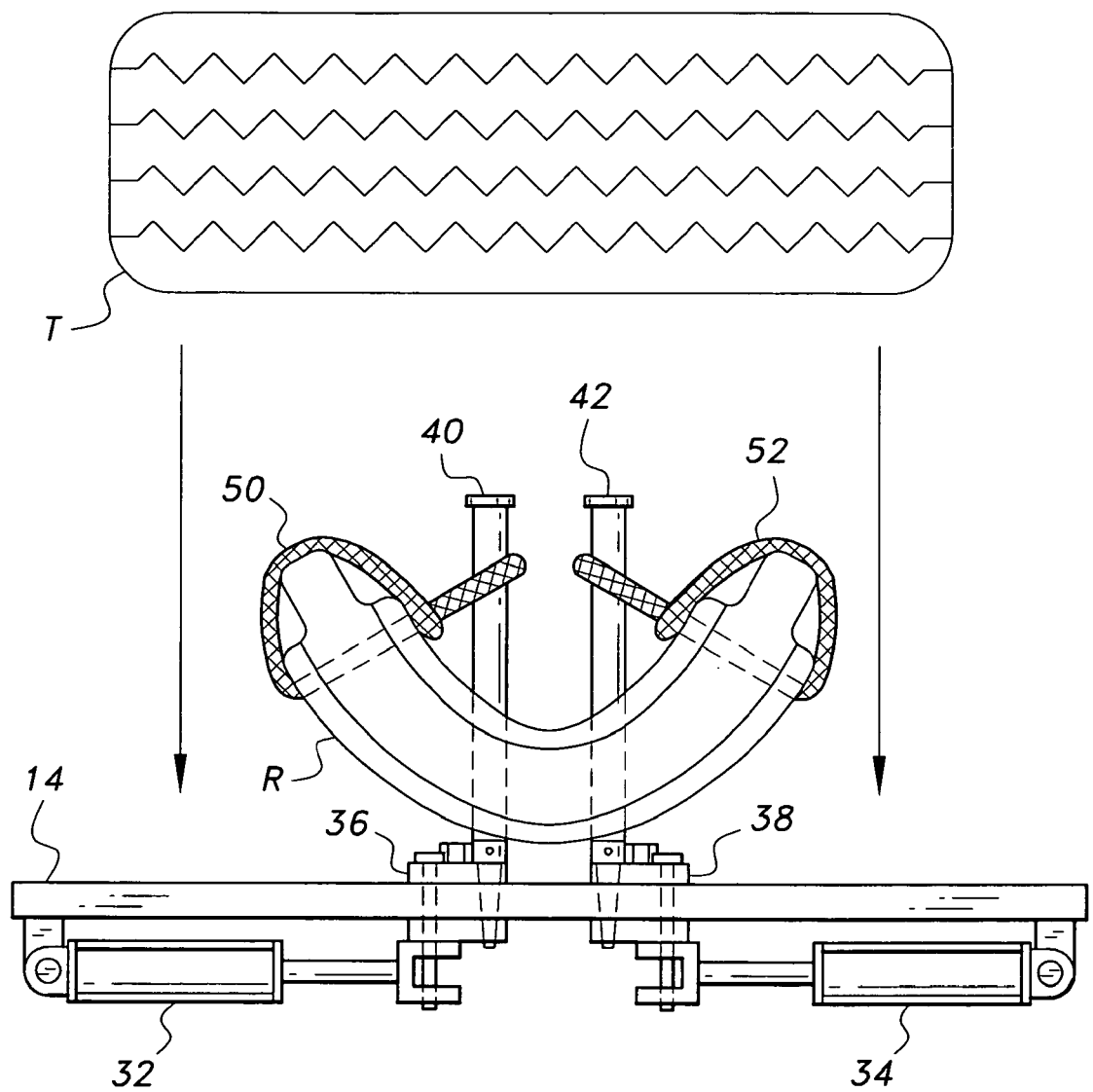
FIG. 14 is a simplified elevation view of the embodiment of FIG. 1, showing the compression of the run-flat ring to fit through the wheel opening of the tire as the tire is lowered over the compressed ring.

At this point, the run-flat ring R (if serviceable) or a new run flat ring R may be placed upon the table 14, as shown in FIG. 13. The two opposite ring compression actuators 32 and 34 are actuated to draw their corresponding slides 36 and 38 apart from one another, and the two ring compression posts 40 and 42 are installed in their slides. The first and second ring compression straps 50 and 52 are secured about the run-flat ring R, and their ends are secured to the corresponding posts 40 and 42. At this point, the two actuators 32, 34 are operated to move the slides 36, 38 and their posts 40, 42 toward one another, thereby collapsing or compressing the run-flat ring R generally as shown in FIG. 14 to ready it for placement of a new or serviceable tire T therearound.

Once the tire T has been placed over the ring R, the actuators 32, 34 are retracted to allow the ring to expand and to allow the straps 50, 52 and posts 40, 42 to be removed. The expanded ring R must still be properly positioned in the tire T, however; this process is shown in FIG. 15 of the drawings. The ring push actuator 86 and tire retaining actuator, working against one another, are used to accomplish this. The ring push tool 90 is installed in the ring push actuator slide 88, and the shoe or plate 92 of the tool 90 is positioned toward the inner surface of the run-flat ring R. The tire push plate 96 extending from the actuator 94 is placed against the outer tread of the tire T, with the tool 90 and its shoe 92 and the tire retaining actuator 94 and its plate 96 in alignment with one another. When the two actuators 94 and 86 are operated to extend their rams toward one another, the run-flat ring R is pushed into the casing of the tire T, as shown in FIG. 15.

The final step is shown in FIG. 16, where the opposite side of the run-flat ring R is pushed into the interior of the tire T. To accomplish this, the bead puller hook and cable 102 are secured to the lower bead LB of the tire, to pull the lower bead downwardly and outwardly when the lower bead puller actuator 98 is operated to draw its arm 100 outwardly. This expands the gap between the upper and lower beads UB and LB sufficiently to allow the run-flat ring R to enter the casing of the tire T at that side, completing the installation of the run-flat ring R in the tire T.

FIGS. 17 through 21 provide illustrations of a second embodiment of the tire run-flat ring machine, designated as machine 210. The machine 210 includes a base 212 supporting a table 214 by a series of legs 216. The general central portion of the table 214 includes mutually orthogonal first and second slots, respectively 220 and 222, forming a cruciform configuration, with the first slot having mutually opposed first and second ends 224, 226 and the second slot having mutually opposed first and second ends 228, 230.

Figure 17:
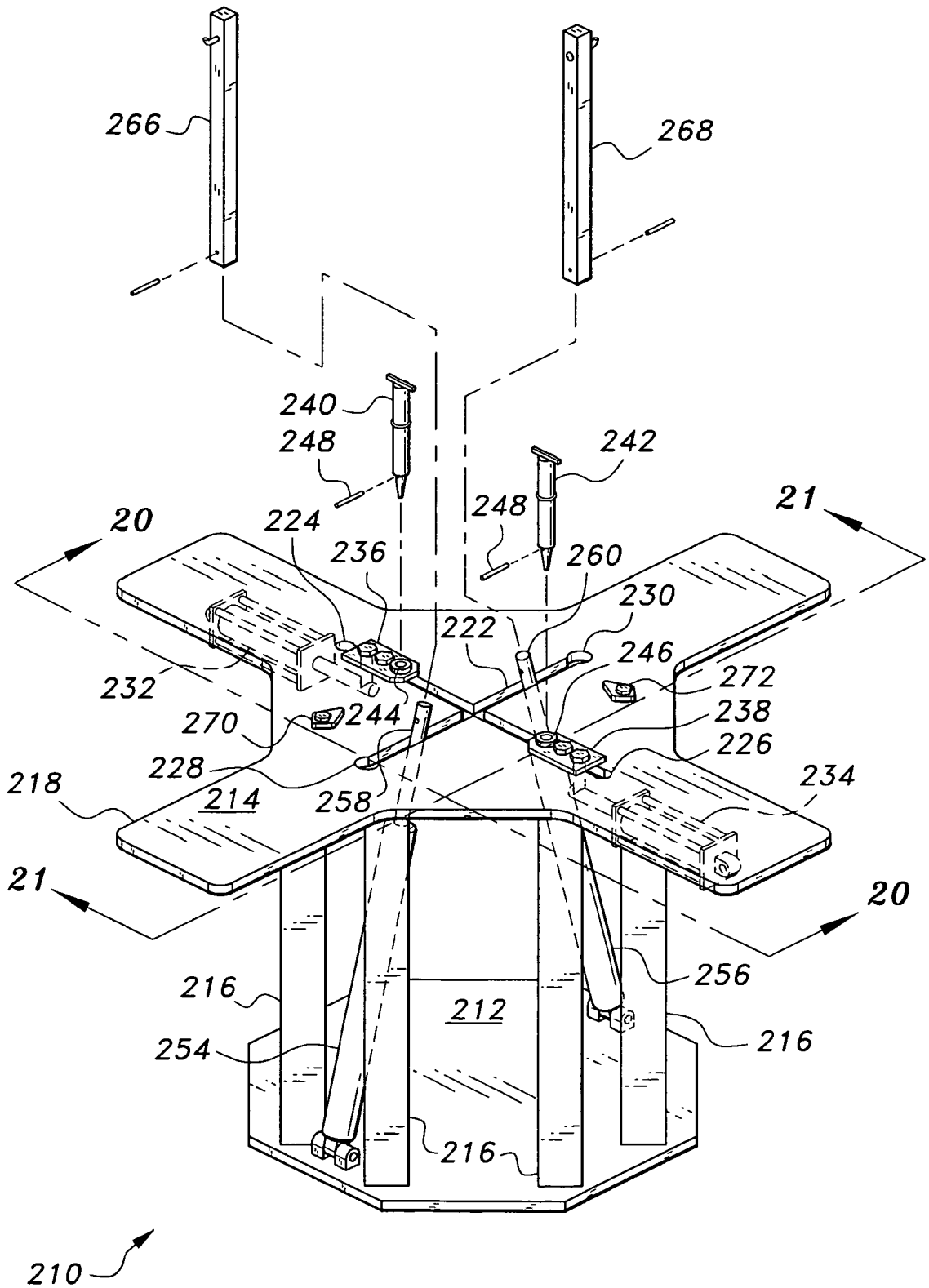
FIG. 17 is a perspective view of a second embodiment of a tire run-flat ring removal and installation machine according to the present invention, with various working tools shown exploded therefrom.
Figure 20:
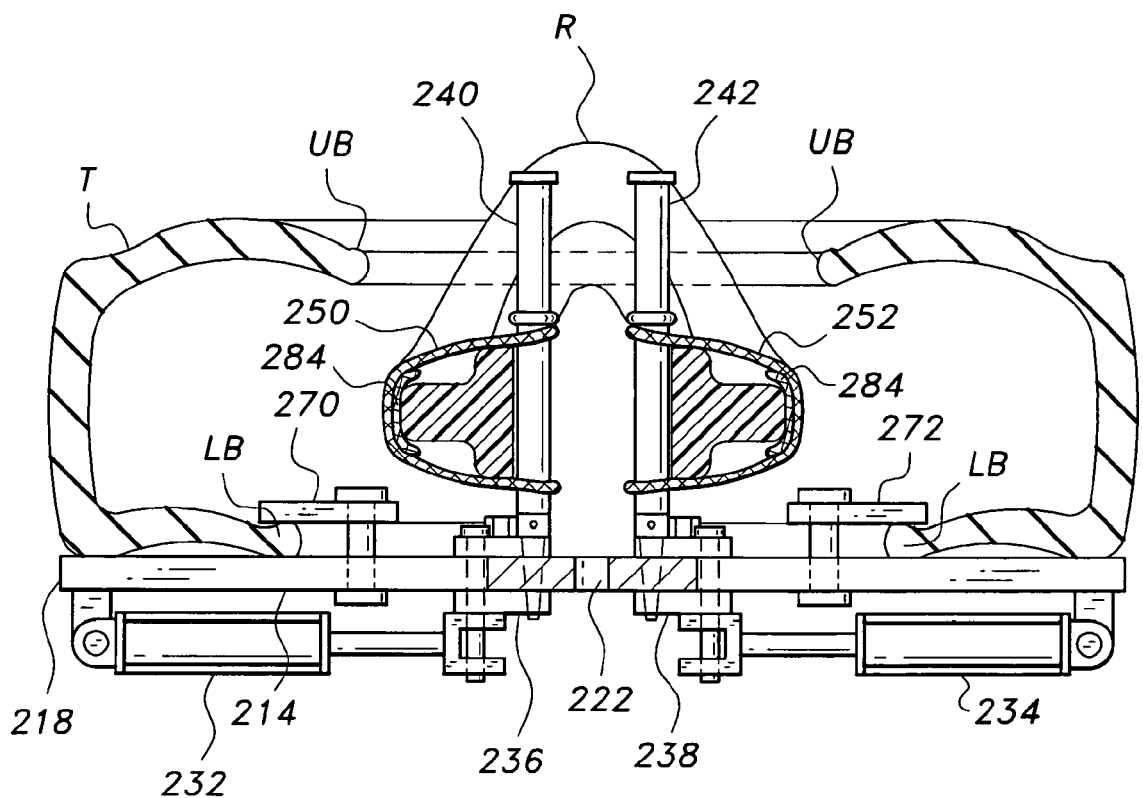
FIG. 20 is a simplified section view along lines 20-20 of FIG. 17, with the tire and run-flat ring shown in section and the run-flat ring compressed by the corresponding actuators.

FIG. 20 is an elevation view in section along lines 20-20 of FIG. 17, illustrating the run-flat ring compression actuators disposed beneath the table 214. This section is laterally displaced from the centerline of the table along the first slot 220, so that only the end-on view of the second slot 222 is visible in FIG. 20. First and second ring compression actuators, respectively 232 and 234, are attached between the respective first and second ends 224 and 226 of the first slot 220 and the table periphery 218, and beneath the table 214. These actuators 232, 234, as well as others discussed further below, are preferably operated hydraulically, but may alternatively be actuated pneumatically or electromechanically as described further above in the first embodiment of FIGS. 1 through 16. The control system for these two actuators 232, 234, as well as for the ring lifting actuators described further below, is essentially the same as the actuation system illustrated schematically in FIG. 6 of the drawings and described further above.

Each ring compression actuator 232, 234 drives an actuator rod or shaft that connects respectively to a first and a second ring compression slide 236, 238. Each of the slides 236, 238 comprises an assembly having a bottom plate to which the distal end of the actuator rod is connected, and an opposite top plate. The two plates slide on opposite sides of the table 214 and are secured to one another by a series of bolts or pins that pass through the first slot 220. First and second ring compression posts, respectively 240 and 242, are removably installed within corresponding sockets or receptacles 244, 246 through the two slide assemblies 236 and 238; as shown in FIG. 17. Each compression post preferably has a tapered lower end, with the corresponding compression post socket 244, 246 having a corresponding taper. Diametric pins 248 may be used to lock the posts 240, 242 in their respective sockets 244, 246, as shown in FIG. 17. First and second ring compression straps, respectively 250 and 252, are removably installed about the respective posts 240, 242 and secured about the run-flat ring to compress the ring; this process is illustrated in FIG. 20 and discussed in detail further below.

Figure 19:
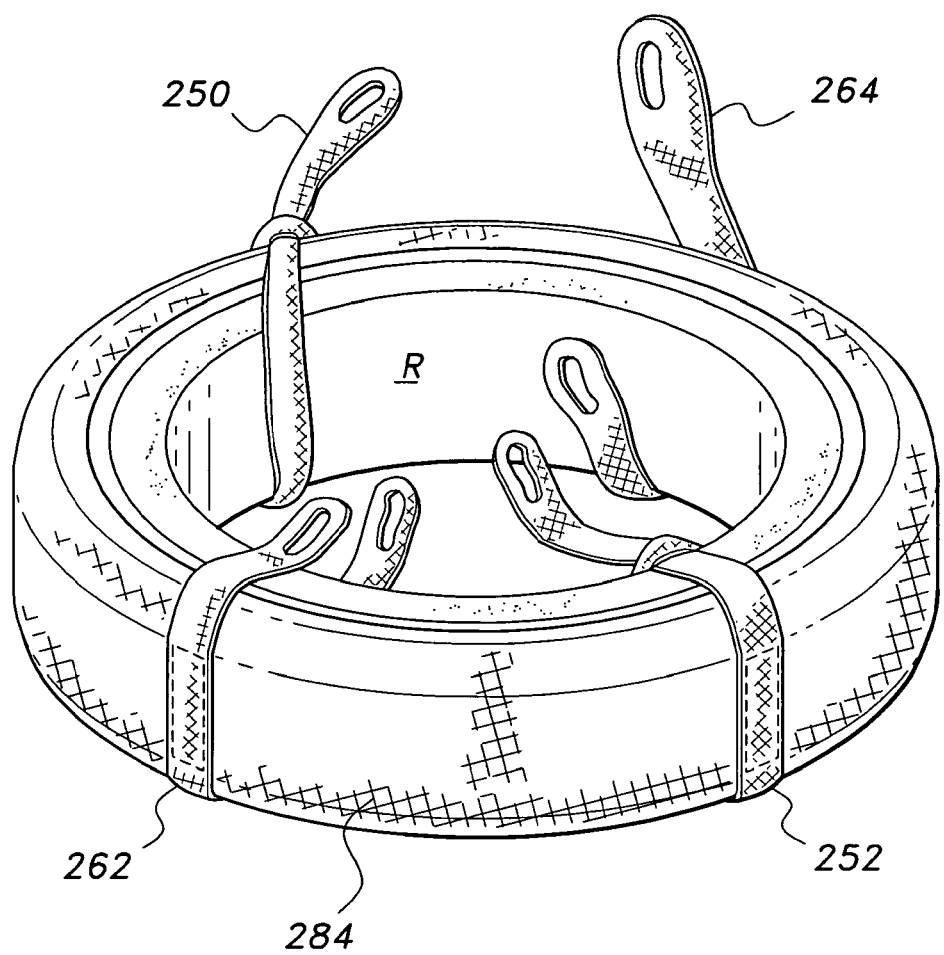
FIG. 19 is a perspective view of a run-flat ring having a harness installed thereon to facilitate removal of the ring from the tire casing.
Figure 21:
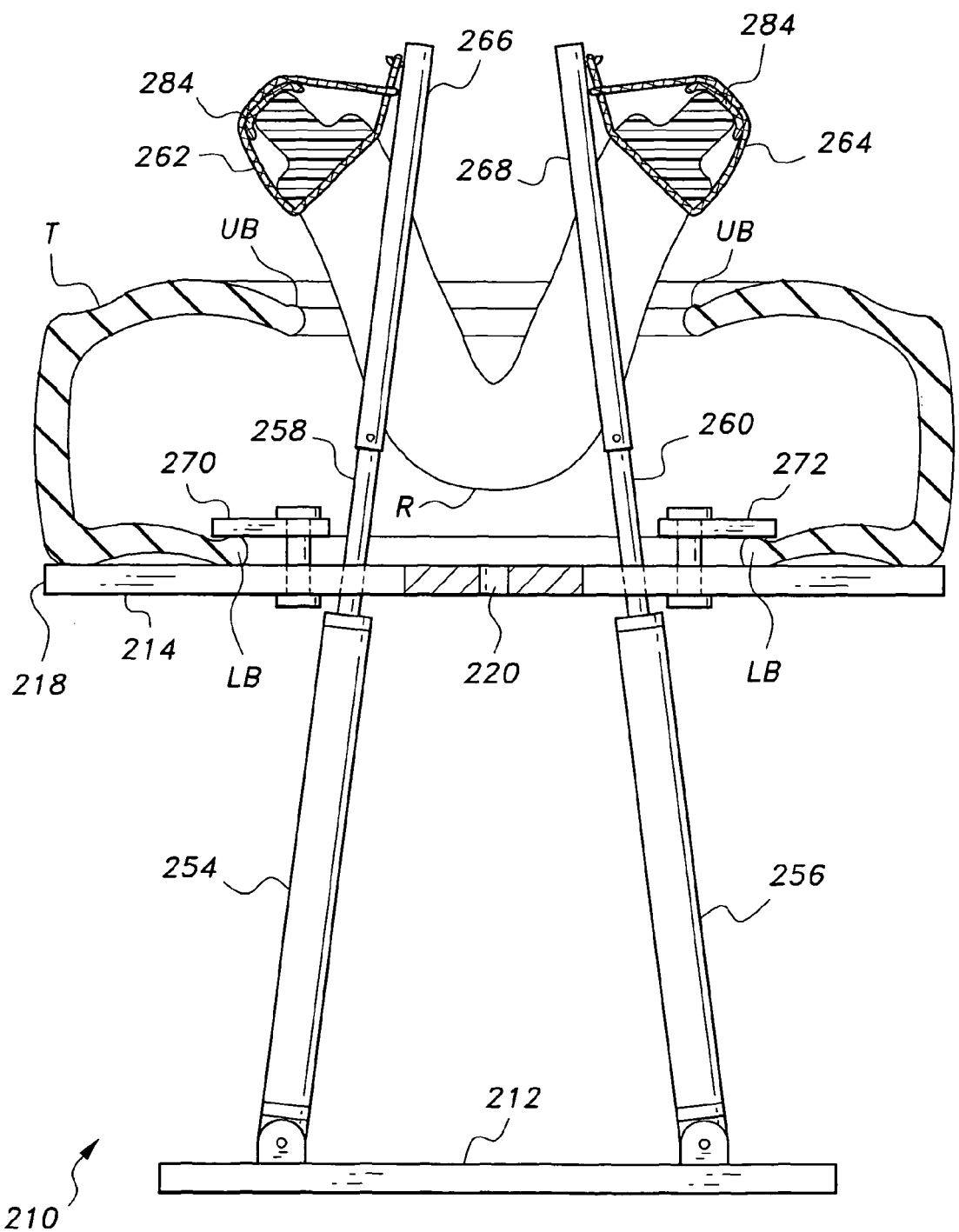
FIG. 21 is a simplified section view along lines 21-21 of FIG. 17, with the tire and run-flat ring shown in section and showing the lifting of the opposite sides of the run-flat ring by the corresponding actuators.

Two additional actuators are disposed beneath the table 214 and operate through the second slot 222. These two actuators 254 and 256 are larger or longer than the ring compressor actuators 232 and 234, and are used to lift or pull the run-flat ring from within the tire casing after the ring has been compressed by the ring compression slides 236, 238 and their posts 240, 242 and straps 250, 252 disposed within the center of the tire casing. These ring lifting actuators 254 and 256 have base or anchor ends pivotally secured to the base 212 of the machine and extend upwardly therefrom, with distal actuator rod ends 258 and 260 extending through the second slot 222 respectively adjacent the first and second ends 228 and 230 thereof. First and second run-flat ring lifting straps 262 and 264, shown in FIGS. 19 and 21, are hooked removably to the respective distal ends of the rods 258 and 260 to lift and pull the run-flat ring from the tire casing, which process is described in detail further below. Preferably, the actuators 254, 256 and their extendible rods 258, 260 have sufficient length to preclude need for an extension fixture or tool. However, in the event that a shorter actuator having less travel is used, extension fixtures or tools 266, 268 may be provided for removable placement over the respective rod ends 258 and 260, as shown in FIGS. 17 and 21 of the drawings.

Figure 18:
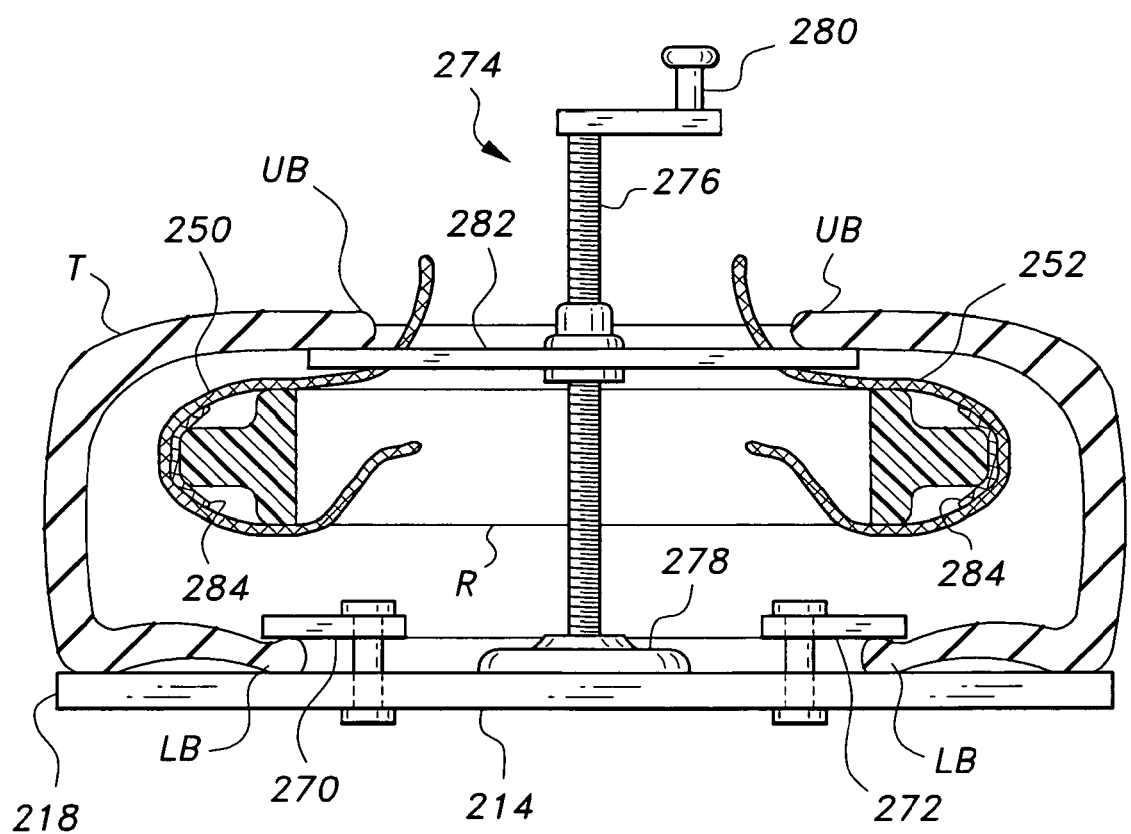
FIG. 18 is a simplified side elevation view of the embodiment of FIG. 17, showing a tire and run-flat ring in section thereon and illustrating a mechanical actuator lifting and expanding the upper bead of the tire to facilitate access to the ring.

FIGS. 18 through 21 illustrate the operation of the machine 210, from the initial placement of a tire and run-flat ring assembly thereon to the removal of the run-flat ring from the tire. In FIG. 18, the initial step of securing the tire T (shown in section in FIGS. 18, 20, and 21) to the table 214 is shown, with the run-flat ring R (shown in section in FIGS. 18, 20, and 21) contained within the tire T. The tire is secured to the table 214 by a pair of lower bead hold-down chocks 270, 272 attached to the table by corresponding pins. The pins are sufficiently long to allow the chocks to slide upwardly for spacing away from the table surface, thereby allowing the lower bead LB of the tire T to be captured between the chocks 126 and 128 and the underlying table surface. The chocks are preferably asymmetrically mounted upon their pins to allow them to be swiveled or pivoted around so their longer ends extend over the lower bead LB of the tire T to secure the tire to the table 214. This also expands the space or distance between the lower bead LB and the opposite upper bead UB, to facilitate access to the interior of the tire T and the run-flat ring R contained therein.

FIG. 18 illustrates another means of spreading the upper and lower beads UB and LB apart to facilitate access to the interior of the tire T and the run-flat ring R contained therein. The lifting of the upper bead UB is accomplished by a tire upper bead lifting jack 274 removably installed upon the top of the table 214 and within the center of the tire T. The jack 274 includes a rotating threaded column 276 extending from a base 278. The column is rotated by a handle 280 at its upper end. Rotation of the column 276 draws a non-rotating cross-member 282 upwardly, with the distal ends of the crossmember extending beneath the upper bead UB of the tire on opposite sides thereof, to pull the upper bead upwardly for access to the interior of the tire T.

The two ring compression straps 250 and 252 and the two ring lifting straps 262 and 264 are sewn or otherwise securely fastened about a ring containment band 284, which serves to keep the four straps 250, 252, 262, and 264 evenly spaced circumferentially about the, run-flat ring R. The configuration of this assembly is shown in FIG. 19 of the drawings, with the band 284 wrapped about the run-flat ring R and the four straps extending therefrom. At this point, the operator wraps the ring containment band 284 circumferentially about the run-flat ring R, with the two ring compression straps 250 and 252 at least generally aligned with their corresponding first and second ring compression slides 236 and 238 and their ring compression posts 240, 242 when installed. The two ring lifting straps 262, 264 are thus automatically aligned at least generally with their corresponding ring lifting actuators 254, 256 and their rod ends 258 and 260. One of the free ends of the straps may be passed back through the loop or eye on the opposite end, with the remaining free end secured to the corresponding post, rod end, or rod end extension. Alternatively, both free ends may be secured to the corresponding ring compression or lifting component.

FIG. 20 illustrates the compression of the run-flat ring R by the two opposed actuators 232, 234 and their ring compressor slides 236, 238 and posts 240, 242. In this Fig., the ends of the two ring compression straps 250 and 252 are secured to the corresponding ring compression posts 240 and 242, and the two posts have been pushed together by actuating their respective ring compression actuators 232 and 234. This causes the run-flat ring R to compress diametrically, as shown in FIG. 20.

The two opposed sides of the run-flat ring R normal to the compressed sides will have a tendency to expand away from one another, back into the tire T unless further measures are taken to prevent this. In FIG. 21, the run-flat ring R is shown being lifted from the tire T by the two ring lifting actuators 254, 256 and their rod end extensions 266, 268. The free end(s) of the two ring lifting straps 262, 264 are hooked to the hook or finger protruding from the distal end of the corresponding rod end extensions 266 and 268. The two ring lifting actuators 254 and 256 are then extended to pull the ring R from within the tire T. Alternatively, the rod end extensions may be deleted, in the event that the actuators and/or their rod ends provide sufficient extension.

Once the run-flat ring R has been freed from the interior of the tire T, the various actuators are returned to their starting positions, the various straps 250, 252, 262, and 264 are released from their corresponding attachments, and the ring containment band 284 is removed from the run-flat ring. The tire T may then be removed from the table 214 by releasing the hold-down chocks 270 and 272. A new or serviceable tire T may then be placed upon the table 214, and a new or serviceable run-flat ring R installed therein. The run-flat ring installation procedure for the second embodiment machine 210 of FIGS. 17 through 21 is not so automated as the process using the machine 10 of FIGS. 1 through 16, but the second embodiment machine 210 does facilitate the reinstallation process to a degree.

Figure 22:
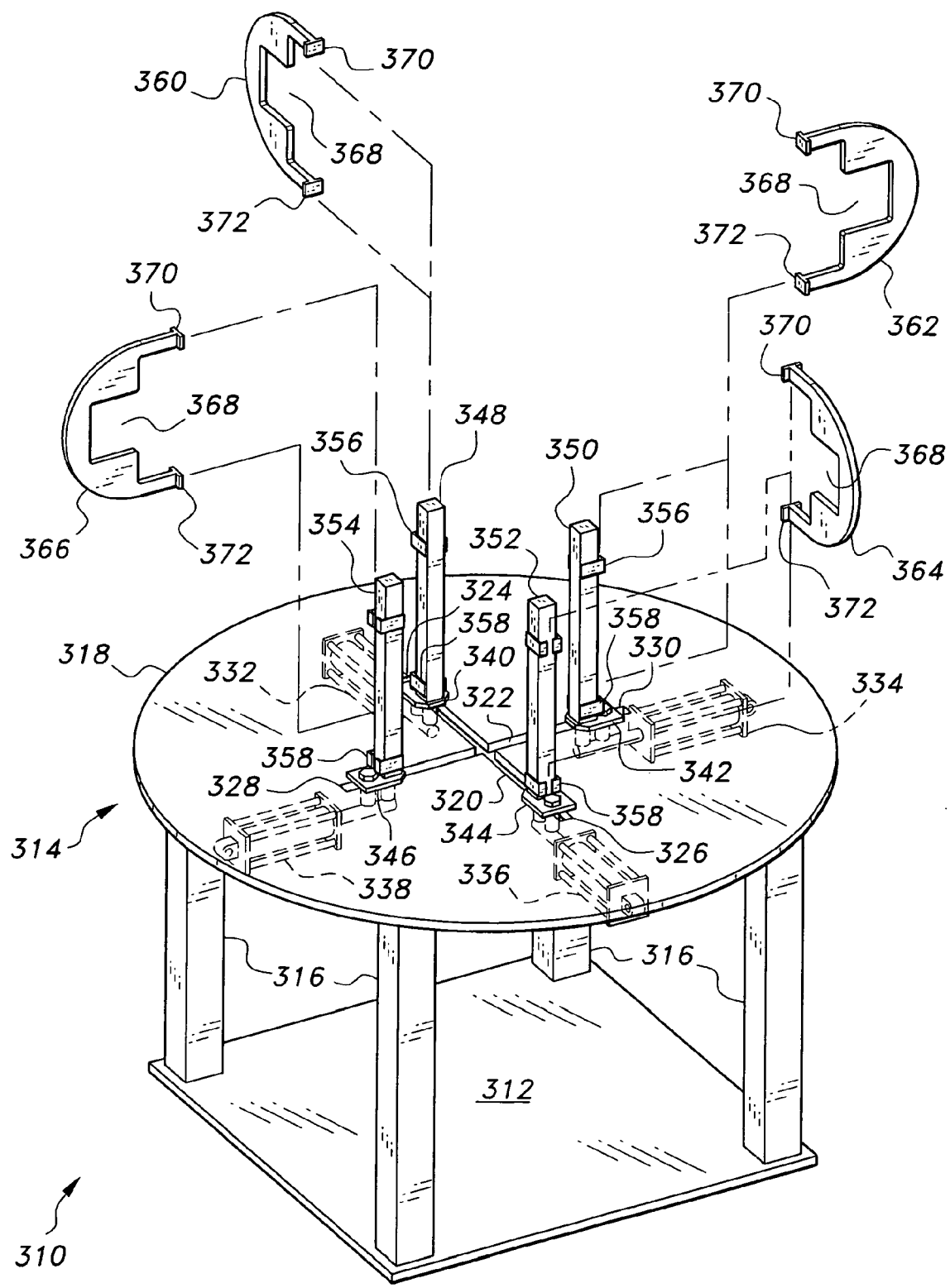
FIG. 22 is a perspective view of a third embodiment of a tire run-flat ring removal and installation machine according to the present invention, with various working tools shown exploded therefrom.
Figure 23:
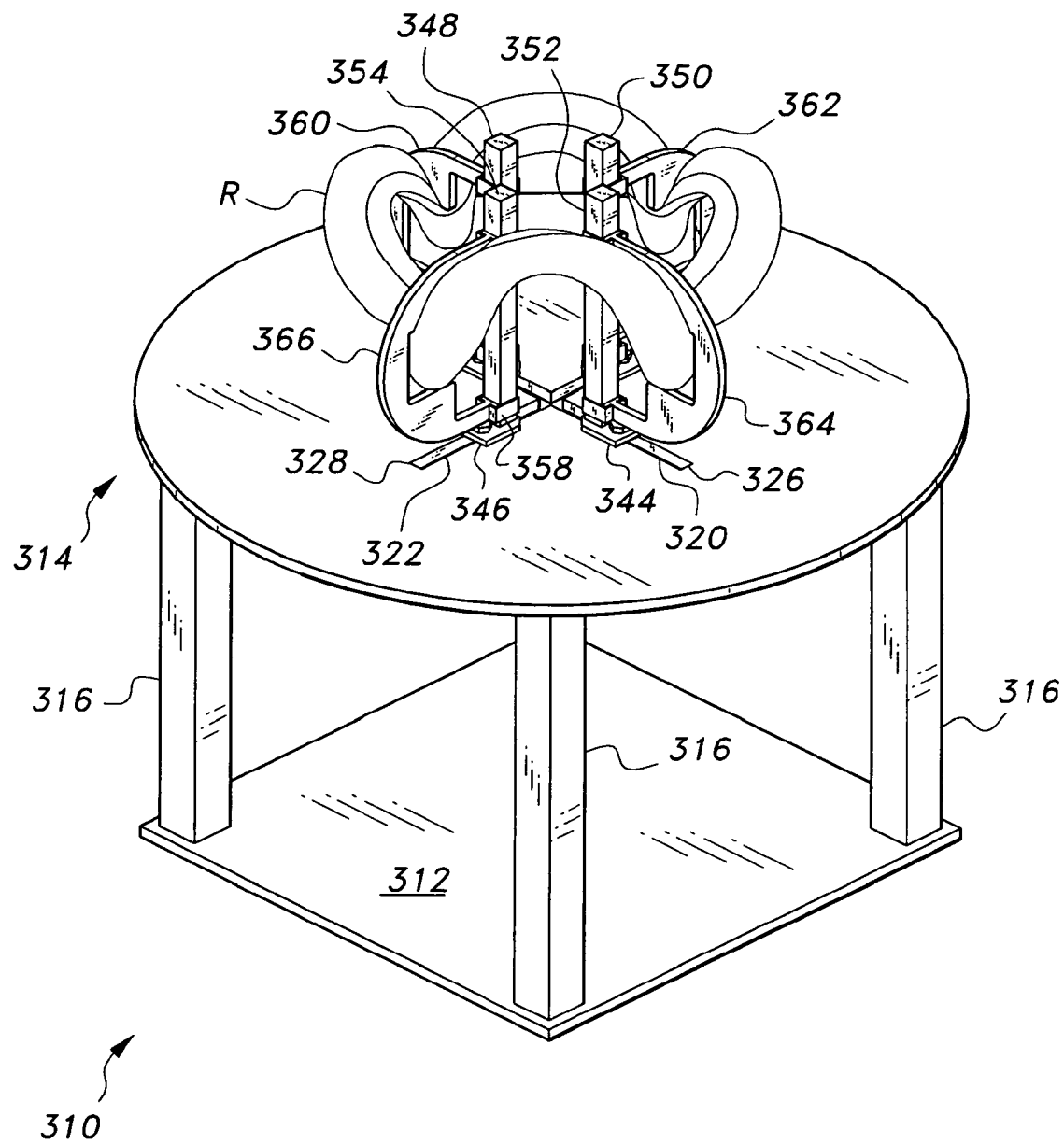
FIG. 23 is a simplified perspective view of the embodiment of FIG. 22, showing compression of the run-flat ring by the corresponding actuators and clamps.

FIGS. 22 and 23 provide illustrations of a more basic third embodiment run-flat machine 310. The machine 310 includes a base 312 supporting a table 314 by a series of legs 316. The general central portion of the table 314 includes mutually orthogonal first and second slots, respectively 320 and 322, forming a cruciform configuration, with the first slot having mutually opposed first and second ends 324, 326 and the second slot having mutually opposed first and second ends 328, 330.

First through fourth ring compression actuators, respectively 332 through 338, are attached between the four ends of the slots 320 and 322 and the table periphery 318 and beneath the table 314. These actuators 332 through 338 are preferably operated hydraulically, but may alternatively be actuated pneumatically or electromechanically as described further above in the first embodiment of FIGS. 1 through 16. The control system for these four actuators 332 through 338 is essentially the same as the actuation system illustrated schematically in FIG. 6 of the drawings and described further above. It will be seen that a single valve may be used to operate all four actuators simultaneously, if so desired. This same principle may be used in other embodiments having paired actuators performing the same function, e.g., two opposed ring compression actuators. However, the provision of a separate control valve for each actuator provides much finer control for the operator.

Each ring compression actuator 332 through 338 drives an actuator rod or shaft that connects respectively to one of four ring compression slides 340 through 346. Each of the slides 332 through 334 comprises an assembly having a bottom plate to which the distal end of the actuator rod is connected, and an opposite top plate. The two plates slide on opposite sides of the table 314 and are secured to one another by a series of bolts or pins that pass through the respective slots 320 and 322. First through fourth ring compression posts, respectively 348 through 354, are removably installed within corresponding sockets or receptacles through the four slide assemblies 340 through 346, generally in the manner used for the first and second embodiments or other conventional removable attachment.

Each of the ring compression posts includes an upper and a lower clamp retainer, respectively 356 and 358. Each of these retainers includes an outwardly facing slot therein, for accepting the mating upper and lower fittings of a series of four essentially identical ring compression clamps 360 through 366. Each of these ring compression clamps has a generally semicircular external shape with a hat-section recess 368 therein, the recess conforming generally to the cross-sectional shape of the run-flat ring R. Each of the clamps 360 through 366 further includes upper and lower tee extensions, respectively 370 and 372, disposed at the opposite sides of the arms or ends defining the hat-section recess 368. These upper and lower tee extensions 370 and 372 drop vertically into the respective upper and lower clamp retainers 356 and 358 of each of the four ring compression posts 348 through 354, with the ring compression clamps extending radially outwardly from their respective posts when removably installed thereto.

The run-flat ring machine 310 is used by placing the tire (not shown in FIGS. 22 and 23) with its run-flat ring therein on top of the table 314, with the central opening of the tire generally centered about the four slides 340 through 346. The four compression posts 348 through 354 may then be installed in their respective slides through the central opening of the tire, and the four ring compression clamps 360 through 366 are manipulated into the tire casing and around the run-flat ring contained therein. The clamps are then connected to their respective posts by means of the upper and lower tees 370, 372 of the clamps and the mating upper and lower retainers 356, 358 extending from each of the posts.

At this point, the controls may be operated to extend the four actuators 332 through 338, thereby driving their slides 340 through 346 and attached posts 348 through 354 and ring compression clamps 360 through 366 inwardly toward the center of the table 314. The result is that the run-flat ring R contained within the ring compression clamps is squeezed together at four points 90 degrees from one another, with the portions of the ring R between the clamps curling up to maintain the circumference of the ring R, somewhat as shown in FIG. 23. This reduces the overall diameter of the run-flat ring R to fit through the inner opening of the tire, allowing the tire to be removed over the run-flat ring R and its compression clamps 360 through 366.

Once the tire has been removed as described above, the four actuators 332 through 338 may be repositioned outwardly to relieve the pressure on the run-flat ring R. The ring compression clamps 360 through 366 may then be removed from their corresponding posts 348 through 354 to allow the run-flat ring R to be removed from the table 314 for inspection. The run-flat ring may be reused, if serviceable, or another ring may be used. The ring is placed around the four posts 348 through 354, and the four ring compression clamps 360 through 366 are reinstalled on their respective posts to capture the run-flat ring between the posts and their clamps. The controls are then operated to compress the run-flat ring R to essentially the configuration shown in FIG. 23, and a new or serviceable tire is placed over the compressed ring, posts, and clamps. The controls are next operated to draw the slides, posts, and clamps outwardly, with the clamps and run-flat ring extending into the tire. Once pressure has been released on the run-flat ring, the four ring compression clamps 360 through 366 may be disconnected from their installation on the ring compression posts 348 through 354 and removed from the interior of the tire. The tire with its installed run-flat ring is then ready for installation on the wheel assembly.

It is to be understood that the present invention is not limited to the embodiments described above, but encompasses any and all embodiments within the scope of the following claims.

The invention claimed is:

1. A tire run-flat ring removal and installation machine, comprising:
   a base;
   a table disposed above the base, the table further including a periphery and mutually orthogonal first and second slots disposed therethrough, each of the slots having mutually opposed first and second ends;
   first and second ring compression actuators disposed beneath the table, outwardly from the respective first and second ends of the first slot;
   first and second ring compression slides disposed along the first slot, connected respectively to the first and second ring compression actuators;
   a ring lifting actuator extending upwardly from the base and having a distal end extending through the second slot; and
   a tire hold-down mechanism disposed generally peripherally about the table.

2. The tire run-flat ring removal and installation machine according to claim 1, wherein the tire hold-down mechanism further comprises:
   a plurality of tire hold-down actuators disposed below and peripherally about the table; and
   a tire hold-down clamp driven by each of the tire hold-down actuators and pivotally attached to the periphery of the table.

3. The tire run-flat ring removal and installation machine according to claim 1, wherein the tire hold-down mechanism further comprises:
   a rigid toroidal tire hold-down ring removably disposed above the table; and
   a plurality of tensile fasteners extending from the tire hold-down ring, removably attached to the periphery of the table.

4. The tire run-flat ring removal and installation machine according to claim 1, further comprising:
   a ring compression post removably extending from each of the ring compression slides;
   a ring compression strap removably secured to each ring compression post; and
   a ring lifting strap removably secured to the distal end of the ring lifting actuator.

5. The tire run-flat ring removal and installation machine according to claim 1, further comprising:
   a ring push actuator disposed beneath the table, generally opposite the ring lifting actuator;
   a ring push slide disposed along the second slot, connected to the ring push actuator; and
   a tire retaining actuator disposed atop the table outwardly from and at least generally radially aligned with the ring push actuator and ring push slide.

6. The tire run-flat ring removal and installation machine according to claim 1, further comprising:
   a tire lower bead puller actuator disposed beneath the table outwardly from the ring lifting actuator and radially aligned therewith;
   an actuator arm extending from the actuator and through the second slot in the table, the actuator arm having a distal end above the table; and
   a tire lower bead attachment hook extending from the distal end of the actuator arm.

7. The tire run-flat ring removal and installation machine according to claim 1, further comprising a plurality of tire lower bead hold-down chocks disposed about the table and extending upwardly therefrom.

8. The tire run-flat ring removal and installation machine according to claim 1, further comprising a tire upper bead lifting tool removably installed upon the distal end of the ring lifting actuator.

9. The tire run-flat ring removal and installation machine according to claim 1, further comprising a control system disposed upon the table and communicating with each of the actuators.

10. The tire run-flat ring removal and installation machine according to claim 1, wherein each of the actuators is selected from the group consisting of hydraulic actuators, pneumatic actuators, and electromechanical actuators.

11. A tire run-flat ring removal and installation machine, comprising:
    a base;
    a table disposed above the base, the table further including a periphery and mutually orthogonal first and second slots disposed therethrough, each of the slots having mutually opposed first and second ends;
    first and second ring compression actuators disposed beneath the table and outwardly from the respective first and second ends of the first slot;
    first and second ring compression slides disposed along the first slot, connected respectively to the first and second ring compression actuators; and
    mutually opposed first and second ring lifting actuators extending upwardly from the base, each having a distal end extending through the second slot.

12. The tire run-flat ring removal and installation machine according to claim 11, further comprising:
    a ring compression post removably extending from each of the ring compression slides;
    a ring compression strap removably secured to each ring compression post; and
    a ring lifting strap removably secured to the distal end of each ring lifting actuator.

13. The tire run-flat ring removal and installation machine according to claim 11, further comprising:
    an extension post removably installed to the distal end of each ring lifting actuator; and
    a ring lifting strap removably secured to each extension post.

14. The tire run-flat ring removal and installation machine according to claim 11, further comprising a plurality of tire lower bead hold-down chocks disposed about the table and extending upwardly therefrom.

15. The tire run-flat ring removal and installation machine according to claim 11, further comprising a control system disposed upon the table and communicating with each of the actuators.

16. The tire run-flat ring removal and installation machine according to claim 11, wherein each of the actuators is selected from the group consisting of hydraulic actuators, pneumatic actuators, and electromechanical actuators.

17. A tire run-flat ring removal and installation machine, comprising:
- a base;
- a table disposed above the base, the table further including a periphery and mutually orthogonal first and second slots disposed therethrough, each of the slots having mutually opposed first and second ends;
- a plurality of ring compression actuators disposed beneath the table and outwardly from the first and second ends of each of the slots; and
- a ring compression slide disposed along each of the slots, connected to a corresponding one of the ring compression actuators.

18. The tire run-flat ring removal and installation machine according to claim 17, further comprising:
- a ring compression post removably extending from each of the ring compression slides; and
- a ring compression clamp removably secured to each ring compression post and extending radially outwardly therefrom.

19. The tire run-flat ring removal and installation machine according to claim 17, further comprising a control system disposed upon the table and communicating with each of the actuators.

20. The tire run-flat ring removal and installation machine according to claim 17, wherein each of the actuators is selected from the group consisting of hydraulic actuators, pneumatic actuators, and electromechanical actuators.

* * * * *